United States Patent
Takasawa

(10) Patent No.: US 12,291,162 B2
(45) Date of Patent: May 6, 2025

(54) VEHICLE PASSENGER RESTRAINT DEVICE AND FAR SIDE AIRBAG FOLDING METHOD

(71) Applicant: TOYOTA JIDOSHA KABUSHIKI KAISHA, Aichi-ken (JP)

(72) Inventor: Hideki Takasawa, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/519,072

(22) Filed: Nov. 27, 2023

(65) Prior Publication Data

US 2024/0208451 A1    Jun. 27, 2024

(30) Foreign Application Priority Data

Dec. 26, 2022   (JP) .................................. 2022-208915

(51) Int. Cl.
| | |
|---|---|
| *B60R 21/231* | (2011.01) |
| *B60R 21/207* | (2006.01) |
| *B60R 21/233* | (2006.01) |
| *B60R 21/2338* | (2011.01) |
| *B60R 21/237* | (2006.01) |

(52) U.S. Cl.
CPC ...... *B60R 21/23138* (2013.01); *B60R 21/207* (2013.01); *B60R 21/233* (2013.01); *B60R 21/2338* (2013.01); *B60R 21/237* (2013.01); *B60R 2021/23146* (2013.01); *B60R 2021/23161* (2013.01); *B60R 2021/23324* (2013.01)

(58) Field of Classification Search
CPC ............ B60R 2021/23161; B60R 2021/23146
See application file for complete search history.

(56) References Cited

U.S. PATENT DOCUMENTS

| | | | |
|---|---|---|---|
| 11,267,427 B1* | 3/2022 | Deng .................... | B60R 21/207 |
| 2012/0139211 A1 | 6/2012 | Loibl et al. | |
| 2013/0113193 A1 | 5/2013 | Börjeson et al. | |
| 2014/0151984 A1* | 6/2014 | Fukawatase ...... | B60R 21/23138 |
| | | | 280/730.2 |
| 2015/0158453 A1 | 6/2015 | Fujiwara | |

(Continued)

FOREIGN PATENT DOCUMENTS

| | | | | |
|---|---|---|---|---|
| CN | 113002475 A | * | 6/2021 | ........... B60R 21/207 |
| CN | 113320496 A | * | 8/2021 | ........... B60R 21/207 |

(Continued)

*Primary Examiner* — Nicole T Verley
(74) *Attorney, Agent, or Firm* — HAUPTMAN HAM, LLP

(57) ABSTRACT

A vehicle passenger restraint device includes a left seat and a right seat provided in a vehicle cabin so as to be capable of moving in a vehicle front-rear direction, and a far side airbag that is provided to a vehicle width direction inside portion of a seatback of the right seat and that is configured so as to be inflated and deployed to a vehicle width direction inside of a passenger seated in the right seat by being supplied with gas from an inflator. The far side airbag includes a rear deployment section that is configured to deploy toward a vehicle rear side past the seatback of the right seat. The far side airbag is configured so as to overlap with a seatback of the left seat in side view even when the left seat is disposed displaced in a vehicle front-rear direction with respect to the right seat.

15 Claims, 16 Drawing Sheets

(56) References Cited

U.S. PATENT DOCUMENTS

| | | | |
|---|---|---|---|
| 2017/0232922 A1* | 8/2017 | Wiik | B60R 21/237 |
| | | | 280/730.2 |
| 2018/0265031 A1* | 9/2018 | Deng | B60R 21/2338 |
| 2020/0062212 A1 | 2/2020 | Markusic | |
| 2020/0130629 A1 | 4/2020 | Fuma et al. | |
| 2020/0180546 A1 | 6/2020 | Komura | |
| 2020/0254960 A1* | 8/2020 | Kobayashi | B60R 21/207 |
| 2021/0213904 A1 | 7/2021 | Parker et al. | |
| 2021/0339698 A1* | 11/2021 | Azuma | B60R 21/23138 |

FOREIGN PATENT DOCUMENTS

| | | | | |
|---|---|---|---|---|
| CN | 117944615 A * | 4/2024 | | B60R 21/23138 |
| DE | 102010027401 A1 * | 1/2012 | | B60N 2/42 |
| DE | 112017000853 B4 * | 6/2020 | | B60R 21/23138 |
| DE | 102020213759 A1 * | 9/2021 | | B60R 21/207 |
| EP | 3643566 A1 * | 4/2020 | | B60R 21/207 |
| EP | 3838688 A1 * | 6/2021 | | B60R 21/207 |
| JP | 2015-110373 A | 6/2015 | | |
| JP | 2020066422 A * | 4/2020 | | B60R 21/207 |
| JP | 2020-090258 A | 6/2020 | | |
| JP | 2021-062818 A | 4/2021 | | |
| KR | 1781387 B1 * | 9/2017 | | B60N 2/64 |
| WO | WO-2008099555 A1 * | 8/2008 | | B60R 21/237 |
| WO | WO-2017086707 A1 * | 5/2017 | | B60R 21/207 |

\* cited by examiner

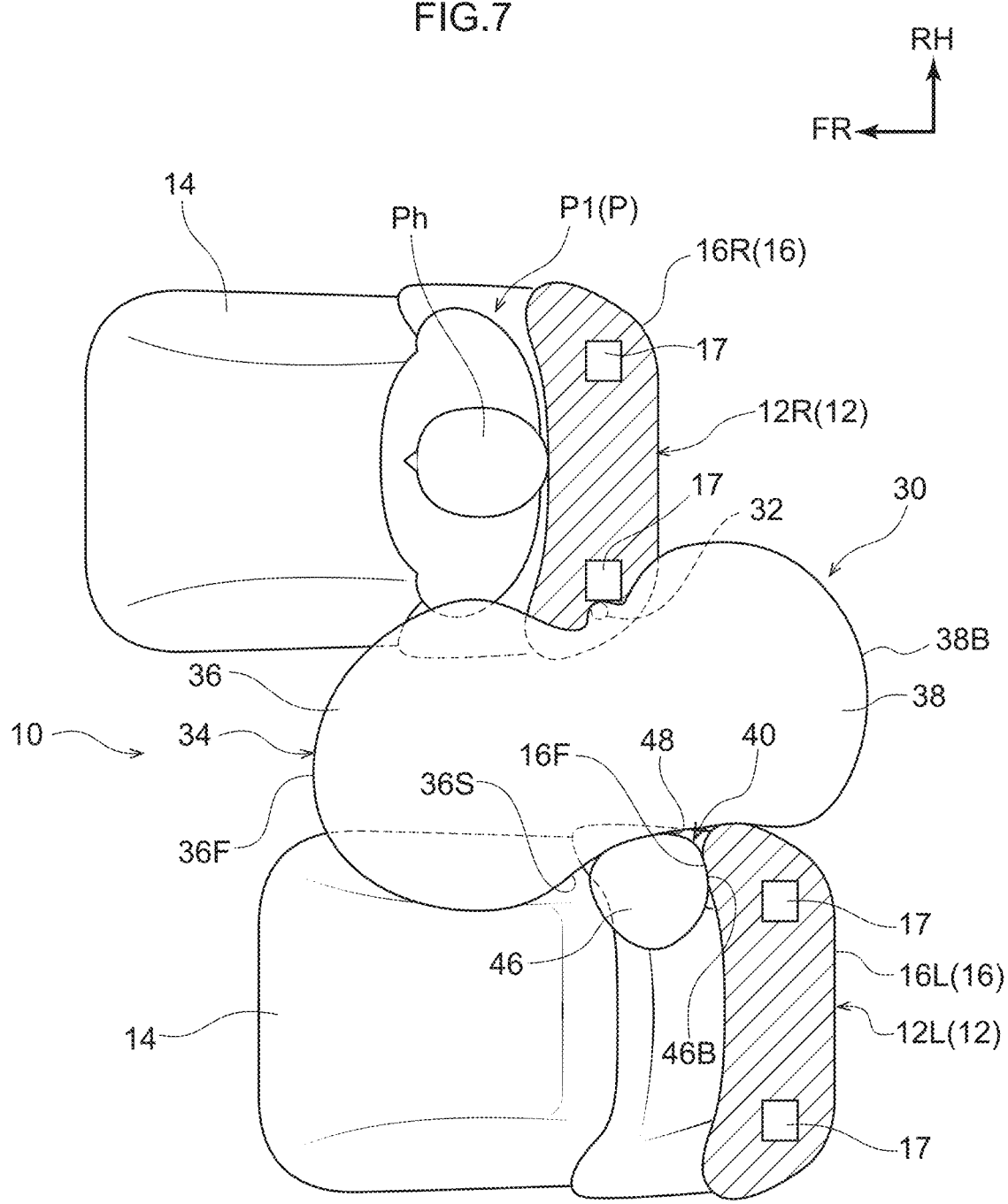

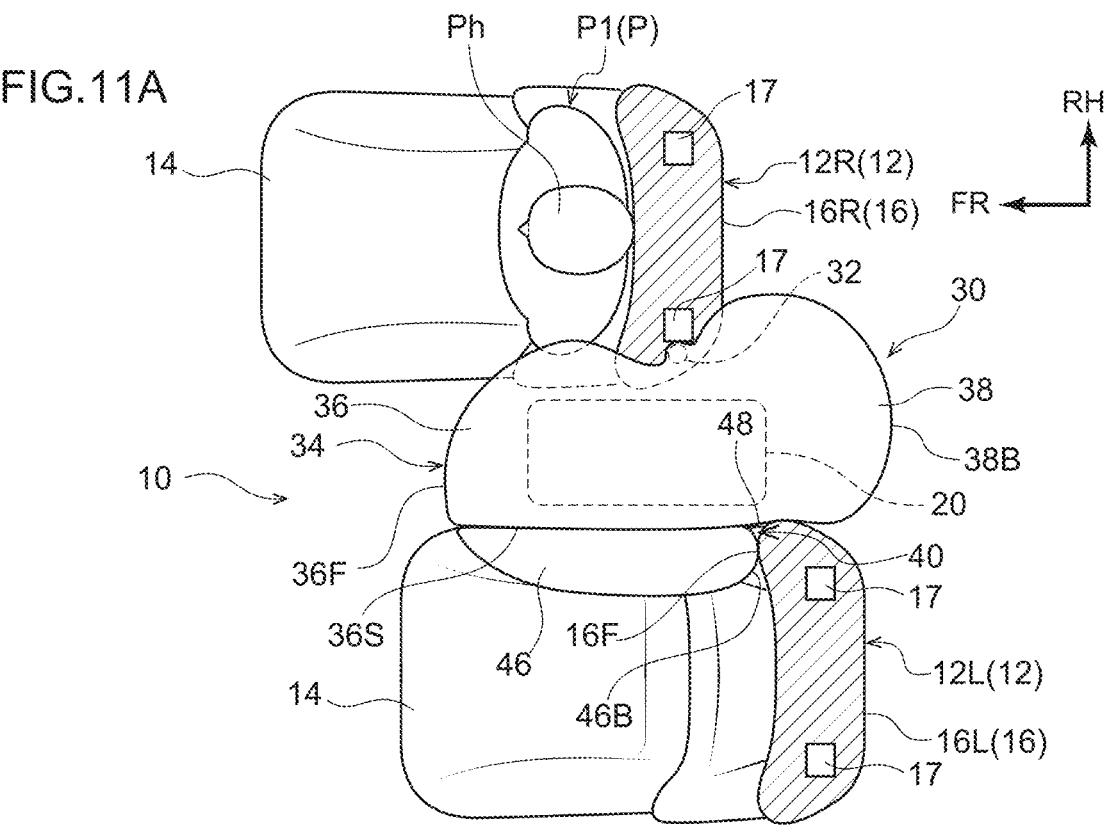
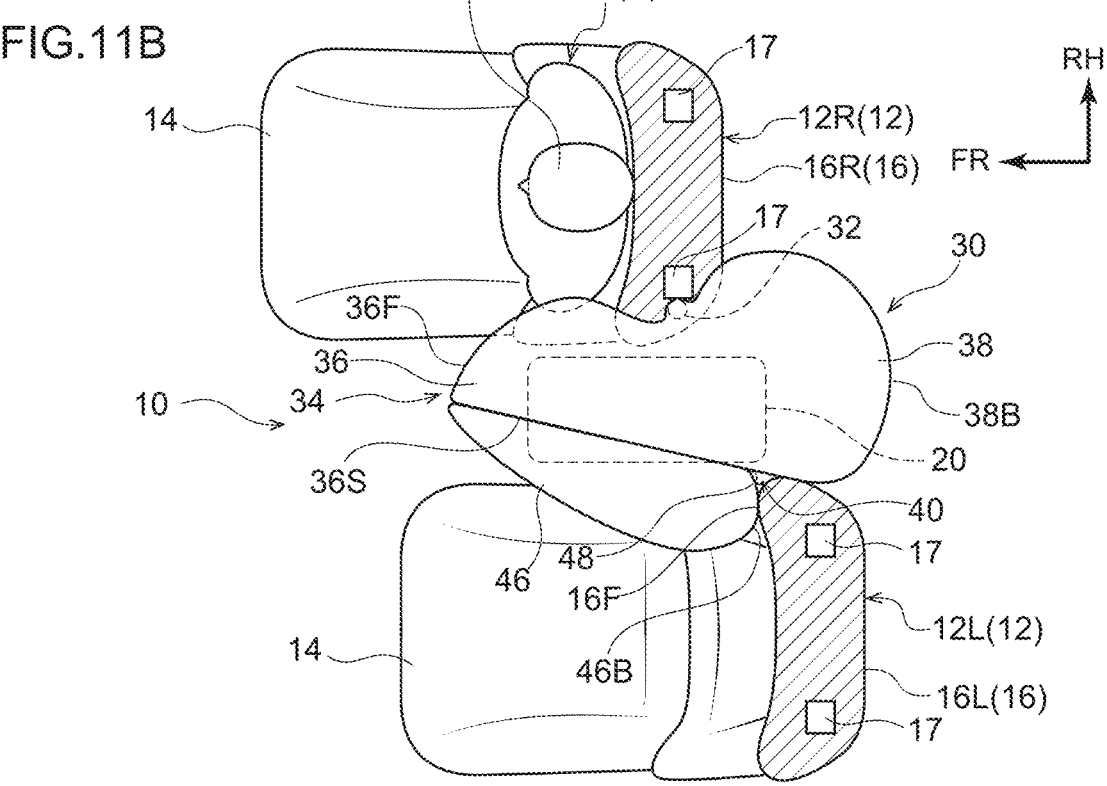

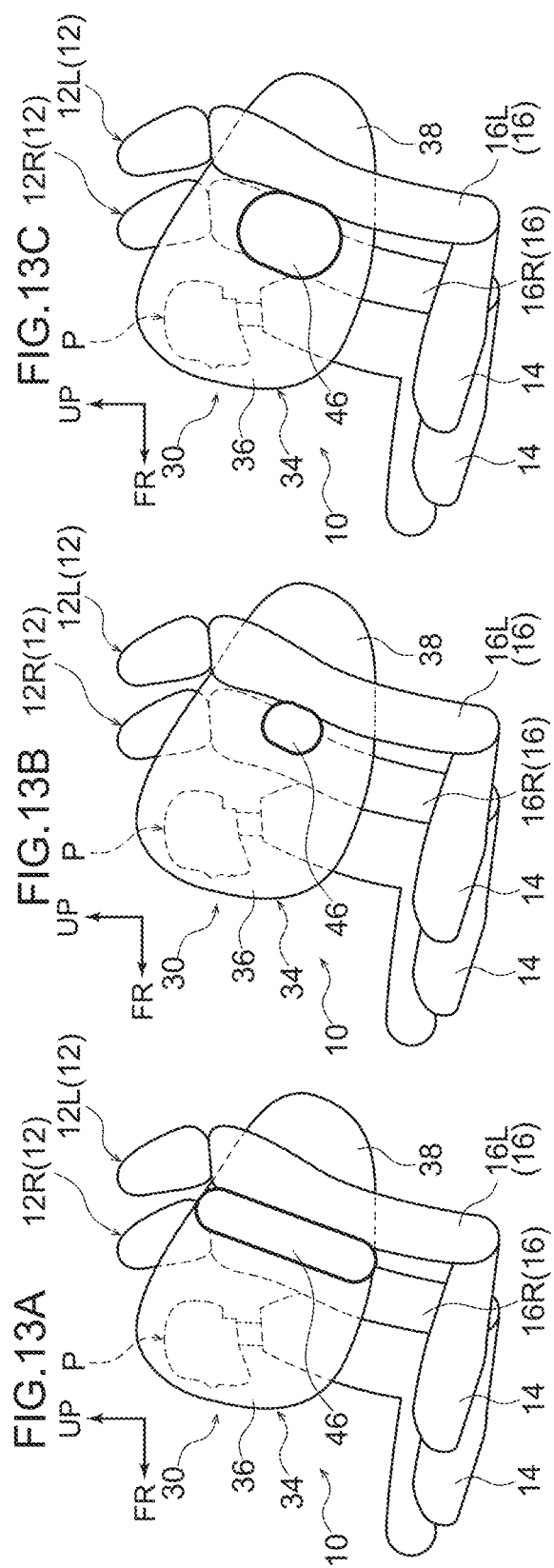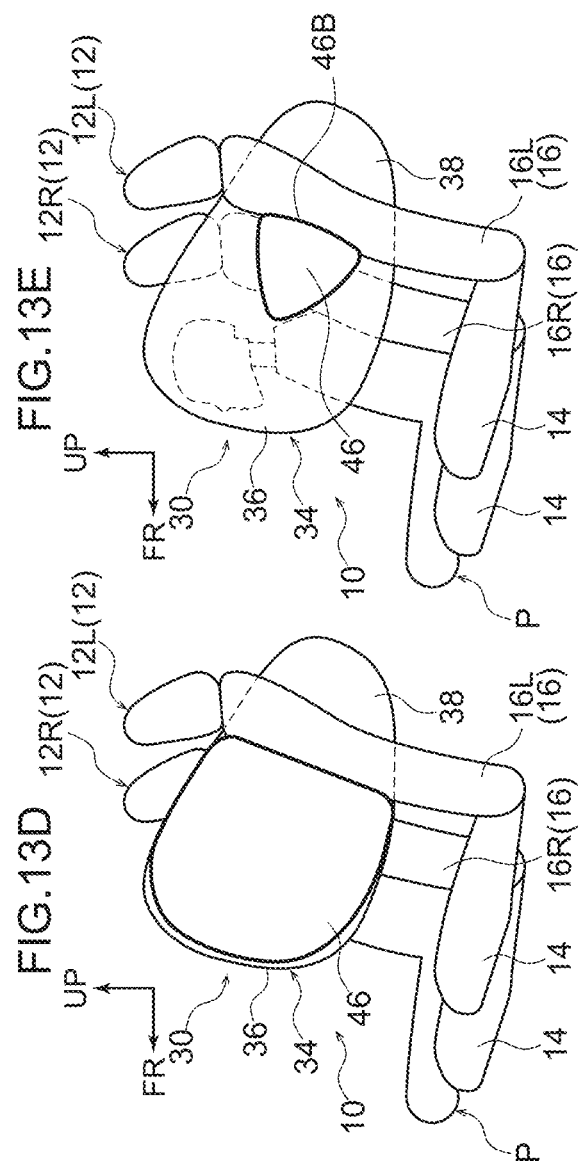

VEHICLE PASSENGER RESTRAINT DEVICE AND FAR SIDE AIRBAG FOLDING METHOD

CROSS-REFERENCE TO RELATED APPLICATION

This application is based on and claims priority under 35 USC 119 from Japanese Patent Application No. 2022-208915 filed on Dec. 26, 2022, the disclosures of which are incorporated by reference herein.

BACKGROUND

Technical Field

The present disclosure is related to a vehicle passenger restraint device and a far side airbag folding method.

Related Art

A hitherto known far side airbag inflates and deploys at a vehicle width direction inside of a passenger seated in a vehicle seat during a vehicle side impact (see, for example, Japanese Patent Application Laid-Open (JP-A) No. 2020-066422). This far side airbag is provided with a sub chamber at the vehicle width direction inside of a main chamber, in a structure configured so as to suppress movement of the passenger under inertia toward the vehicle width direction inside by the main chamber receiving a reaction force from a side support section of a seatback of an adjacent vehicle seat through the sub chamber.

However, the above structure is limited to cases in which left and right vehicle seats are arranged alongside each other at the same position in a vehicle front-rear direction.

Namely, in cases in which left and right vehicle seats are arranged displaced from each other in the vehicle front-rear direction, there is a possibility that the sub chamber does not hit the side support section of the seatback of the adjacent vehicle seat, and there is accordingly a possibility that the main chamber is not able to obtain sufficient reaction force from the side support portion through the sub chamber.

If the main chamber does not obtain sufficient reaction force from the side support section at the seatback of the adjacent vehicle seat through the sub chamber, then there is a possibility that this leads to the passenger, who has moved under inertia toward the main chamber (toward the vehicle width direction inside), tilting over toward the vehicle width direction inside together with the main chamber. There is accordingly room for improvement in a structure configured so as to be able to restrain a passenger using a far side airbag when left and right vehicle seats (a left seat and a right seat) are disposed displaced from each other in the vehicle front-rear direction.

SUMMARY

An object of the present disclosure is to obtain a vehicle passenger restraint device capable of restraining a passenger using a far side airbag even when a left seat and a right seat are disposed so as to be displaced from each other in the vehicle front-rear direction, and to obtain a far side airbag folding method of the same.

In order to achieve the above object, a vehicle passenger restraint device of a first aspect includes a left seat and a right seat provided in a vehicle cabin so as to each can be movable in a vehicle front-rear direction, an inflator that is provided at a vehicle width direction inner side portion of a seatback of one seat of the left seat or the right seat and that is configured to eject gas on actuation, and a far side airbag that is provided at the vehicle width direction inner side portion of the seatback of the one seat, and that is configured so as to be inflated and deployed to a vehicle width direction inner side of a passenger seated in the one-seat by being supplied with the gas. The far side airbag includes a main chamber, and a rear deployment section that is integrally provided to the main chamber, and that is configured so as to be deployed toward a vehicle rear side past the seatback of the one-seat. The far side airbag is configured so as to overlap with a seatback of another seat of the left seat or the right seat in side view even when the otherseat is disposed displaced in the vehicle front-rear direction with respect to the one-seat.

In the vehicle passenger restraint device of the first aspect, the inflator provided to the vehicle width direction inside portion of the seatback of the one seat of the left seat or the right seat is actuated during a vehicle side impact, and gas ejected from the inflator is supplied into the far side airbag provided to the vehicle width direction inside portion of the seatback of the one seat. The far side airbag is accordingly inflated and deployed toward the vehicle width direction inner side of the passenger seated on the one seat. Note that "during a vehicle side impact" not only includes when a vehicle side impact has been detected, but also when a vehicle side impact has been predicted.

The far side airbag includes the main chamber and the rear deployment section that is integrally provided at the main chamber and that is configured to be deployed toward the vehicle rear side past the seatback of the one seat. The far side airbag accordingly achieves an overlap with the seatback of the other seat in side view even when the other seat of the left seat or the right seat is disposed displaced in the vehicle front-rear direction with respect to the one seat. This thereby enables the far side airbag to obtain reaction force from the seatback of the other seat. Namely, in the present disclosure the passenger is restrained by the far side airbag even when the left seat and the right seat are disposed so as to be displaced from each other in the vehicle front-rear direction.

A vehicle passenger restraint device of a second aspect is the vehicle passenger restraint device of the first aspect, further including a console box provided in the vehicle cabin between the left seat and the right seat, wherein the far side airbag is configured so as to be inflated and deployed further to a vehicle upper side than an upper face of the console box and so as to cover at least from a waist to a head of the passenger in side view.

In the vehicle passenger restraint device of the second aspect, the far side airbag is configured so as to be inflated and deployed further to the vehicle upper side than the upper face of the console box and so as to cover at least from the waist to the head of the passenger in side view. Thus the far side airbag avoids being affected by reaction force from the console box and maintains a consistent inflation and deployment position, and the desired restraint force for the passenger is accordingly exhibited.

A vehicle passenger restraint device of a third aspect is the vehicle passenger restraint device of the first aspect or the second aspect, wherein the far side airbag includes a step portion in a vicinity of a contact point where contact is made with a front end of a side portion of a seatback of the other seat in plan view when the one seat is disposed at a furthest forward position and the other-seat is disposed at a furthest rearward position.

According to the vehicle passenger restraint device of the third aspect, the step portion is formed in the vicinity of the contact point of the far side airbag where contact is made with the front end of the side portion of the seatback of the other-seat in plan view when the one seat is disposed at the furthest forward position and the other-seat is disposed at the furthest rearward position.

During a vehicle side impact, the passenger moves under inertia toward the vehicle width direction inside and presses the far side airbag toward the other seat. When this occurs, the far side airbag attempts to rotate about its rear end portion toward the vehicle width direction inside in plan view and the step portion formed to the far side airbag hooks onto the side portion of the seatback of the other seat, with effective reaction force accordingly being obtained from the seatback of the other seat. The far side airbag is accordingly suppressed from rotating toward the vehicle width direction inside, and the amount of movement (displacement amount) toward the vehicle width direction inside is reduced. Namely, the passenger is more effectively restrained.

A vehicle passenger restraint device of a fourth aspect is the vehicle passenger restraint device of the third aspect, wherein the step portion is formed by plural straps or by a single tether provided inside the far side airbag.

In the vehicle passenger restraint device of the fourth aspect, the step portion is formed by the plural straps or by the single tether provided inside the far side airbag. This means that implementation can be achieved with a simple configuration of the step portion being formed to the far side airbag.

A vehicle passenger restraint device of a fifth aspect is the vehicle passenger restraint device of the fourth aspect, wherein the plural straps or the single tether are disposed so as to connect a proximity point of the inflator on the seatback of the one seat to the front end of the side portion of the seatback of the other-seat in plan view, and a length of the plural straps or the single tether when in a state in which tension is acting from full inflation and deployment of the far side airbag is set so as to be a minimum distance between a side portion of the seatback of the one seat disposed in the furthest forward position and the side portion of the seatback of the other seat disposed in the furthest rearward position.

In the vehicle passenger restraint device of the fifth aspect, the plural straps or the single tether are disposed so as to connect the proximity point of the inflator on the seatback of the one seat to the front end of the side portion of the seatback of the other seat in plan view: The length of the plural straps or the single tether when in a state in which tension is acting from full inflation and deployment of the far side airbag is also set so as to be the minimum distance between the side portion of the seatback of the one seat disposed in the furthest forward position and the side portion of the seatback of the other seat disposed in the furthest rearward position.

This enables the step of the step portion of the far side airbag to be maximized, facilitating the step portion hooking onto the side portion of the seatback of the other seat, and so the far side airbag obtains more effective reaction force from the seatback of the other seat. Note that "front end" according to the vehicle passenger restraint device of the fifth aspect also encompasses in the vicinity of the front end.

A vehicle passenger restraint device of a sixth aspect is the vehicle passenger restraint device of the third aspect, wherein the step portion is formed by a sub chamber provided at a vehicle width direction inner side of the main chamber and in communication with the main chamber.

In the vehicle passenger restraint device of the sixth aspect, the step portion is formed by the sub chamber provided at the vehicle width direction inside of the main chamber and in communication with the main chamber. This thereby enables implementation with a simple configuration by forming the step portion to the far side airbag.

A vehicle passenger restraint device of a seventh aspect is the vehicle passenger restraint device of the sixth aspect, wherein a boundary portion between a vehicle rear side portion of the sub chamber and a vehicle width direction inner side portion of the main chamber is disposed in plan view at the front end of the side portion of the seatback of the other seat when the one-seat is disposed at the furthest forward position and the other seat is disposed at the furthest rearward position.

In the vehicle passenger restraint device of the seventh aspect, the boundary portion between the vehicle rear side portion of the sub chamber and the vehicle width direction inner side portion of the main chamber is disposed in plan view at the front end of the side portion of the seatback of the other seat when the one seat is disposed at the furthest forward position and the other-seat is disposed at the furthest rearward position. This means that the sub chamber readily hooks onto the side portion of the seatback of the other-seat, and the far side airbag obtains more effective reaction force from the seatback of the other seat. Note that "front end" according to the vehicle passenger restraint device of the seventh aspect also encompasses in the vicinity of the front end.

The vehicle passenger restraint device of an eighth aspect is the vehicle passenger restraint device of the first aspect or the second aspect, wherein the far side airbag includes a front chamber and a rear chamber partitioned front-and-rear by a partitioning cloth, the front chamber configures the main chamber and the rear chamber configures the rear deployment section, and the gas ejected from the inflator is configured so as to be supplied from one of the front chamber or the rear chamber, through a communication hole formed in the partitioning cloth, and into another of the front chamber or the rear chamber.

In the vehicle passenger restraint device of the eighth aspect, the far side airbag includes the front chamber and the rear chamber partitioned front-and-rear by the partitioning cloth, the front chamber configures the main chamber and the rear chamber configures the rear deployment section. The gas ejected from the inflator is configured so as to be supplied from the one of the front chamber or the rear chamber, through the communication hole formed in the partitioning cloth, and into the other of the front chamber or the rear chamber. This thereby enables adjustment of pressure of the rear chamber that obtains reaction force from the seatback of the other seat, and the enables adjustment of pressure of the front chamber that restrains the passenger.

A vehicle passenger restraint device of a ninth aspect is the vehicle passenger restraint device of the eighth aspect, wherein the far side airbag includes a sub chamber provided at a vehicle width direction inner side of the main chamber so as to be in communication with the main chamber, and gas ejected from the inflator is configured so as to be supplied to the sub chamber, and also a boundary portion between a vehicle rear side portion of the sub chamber and a vehicle width direction inner side portion of the main chamber is disposed in plan view at a front end of a side portion of the seatback of the other seat when the one seat is disposed at a furthest forward position and the other seat is disposed at a furthest rearward position.

In the vehicle passenger restraint device of the ninth aspect, the far side airbag includes the sub chamber provided at the vehicle width direction inside of the main chamber so as to be in communication with the main chamber. The gas ejected from the inflator is configured so as to be supplied to the sub chamber. This thereby enables adjustment of pressure of the sub chamber.

Moreover, the boundary portion between the vehicle rear side portion of the sub chamber and the vehicle width direction inside portion of the main chamber is disposed in plan view at the front end of a side portion of the seatback of the other seat when the one seat is disposed at the furthest forward position and the other seat is disposed at the furthest rearward position. The sub chamber accordingly readily hooks onto the side portion of the seatback of the other seat, and the far side airbag obtains effective reaction force from the seatback of the other seat. Note that "front end" according to the disclosure of the ninth aspect also encompasses in the vicinity of the front end.

A far side airbag folding method of a tenth aspect is a folding method for the far side airbag of the vehicle passenger restraint device of any one of the first aspect to the ninth aspect. The far side airbag folding method includes an inward folding process of folding the rear deployment section inward so as to be indented toward an inside of the far side airbag, a rolling-from-outside process of rolling up the far side airbag resulting from the inward folding process from outside with an axial direction being a vehicle height direction, and a folding process of folding the far side airbag resulting from the rolling-from-outside process such that an upper end portion and a lower end portion of the far side airbag approach each other.

In the far side airbag folding method of the tenth aspect, after the rear deployment section has been inward folded so as to be indented toward the inside of the far side airbag, the far side airbag is rolled from the outside with an axial direction of the vehicle height direction, and then the far side airbag is folded such that the upper end portion and the lower end portion thereof approach each other. The far side airbag is accordingly able to be folded in a compact manner. Moreover, the rear deployment section has been inward folded and so is readily deployed toward the vehicle rear side at an early stage during inflation and deployment.

As described above, the present disclosure enables a passenger to be restrained by a far side airbag even when a left seat and a right seat are disposed displaced from each other in a vehicle front-rear direction.

BRIEF DESCRIPTION OF THE DRAWINGS

Exemplary embodiments of the present disclosure will be described in detail based on the following figures, wherein:

FIG. 7 is a schematic plan view illustrating an inflated and deployed state of a far side airbag of a vehicle passenger restraint device according to a second exemplary embodiment when a right seat is at a furthest forward position and a left seat is at a furthest rearward position;

FIG. 11A and FIG. 11B are schematic plan views illustrating respective inflated and deployed states of far side airbags of a vehicle passenger restraint device according to a second modified example of the second exemplary embodiment when a right seat is at a furthest forward position and a left seat is at a furthest rearward position;

FIG. 13A to FIG. 13E are schematic side views illustrating respective inflated and deployed states of far side airbags of a vehicle passenger restraint device according to a fourth modified example of the second exemplary embodiment when a right seat is at a furthest forward position and a left seat is at a furthest rearward position;

DETAILED DESCRIPTION

Figure 1:
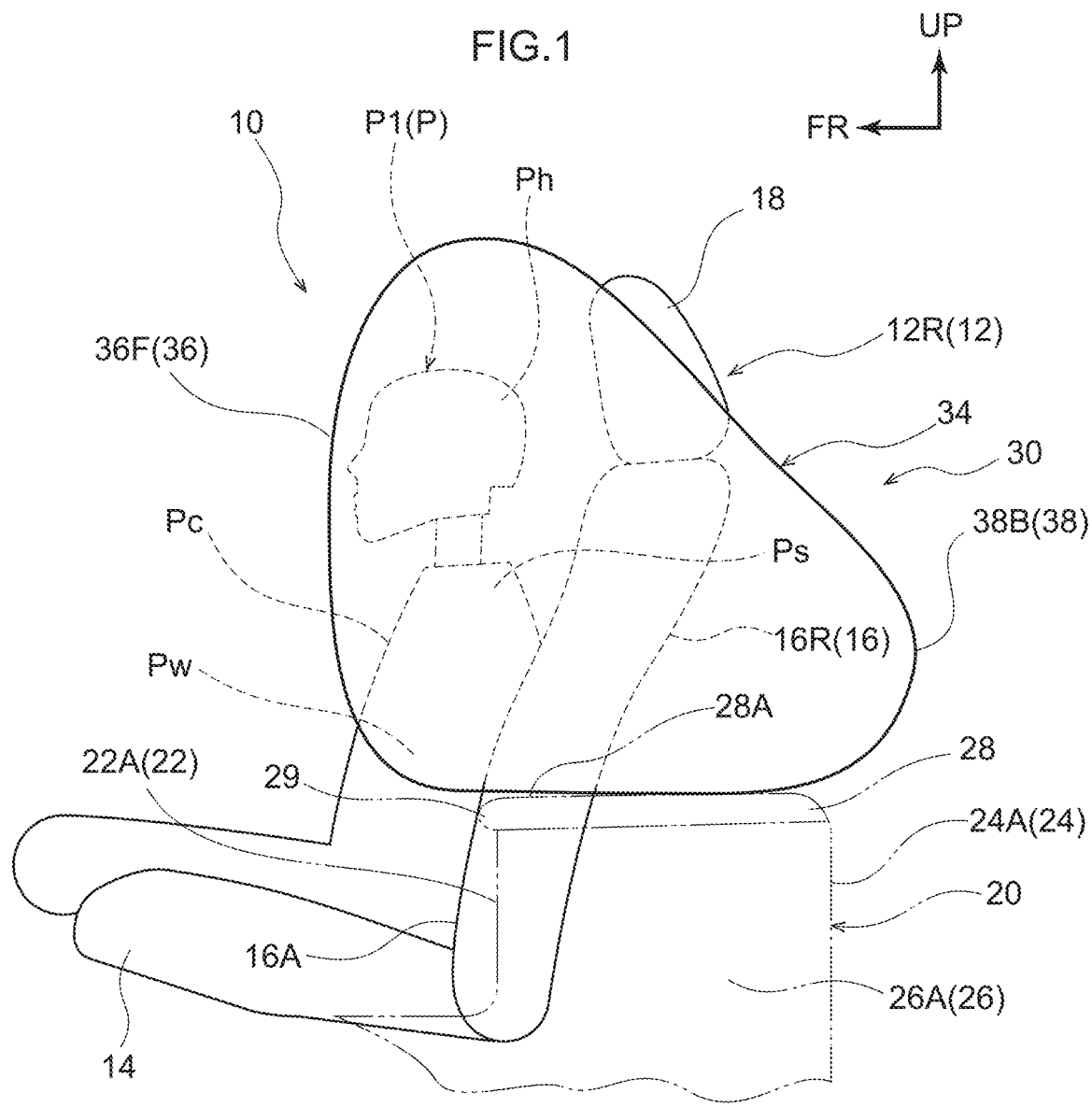
FIG. 1 is a schematic side view illustrating an inflated and deployed state of a far side airbag of a vehicle passenger restraint device according to a first exemplary embodiment when a seat is positioned at a furthest forward position.

Detailed description follows regarding exemplary embodiments according to the present disclosure, with reference to the drawings. Note that for ease of explanation, in the drawings an arrow UP indicates a vehicle and a vehicle seat upward direction, an arrow FR indicates a vehicle and a vehicle seat forward direction, and an arrow RH indicates a vehicle and a vehicle seat rightward direction. Thus unless explicitly stated otherwise, reference in the following description to up and down, front and rear, and left and right directions indicate up and down, front and rear, and left and right directions of the vehicle and the vehicle seat. The left-right direction has the same definition as the vehicle width direction and the seat width direction.

Figure 2:
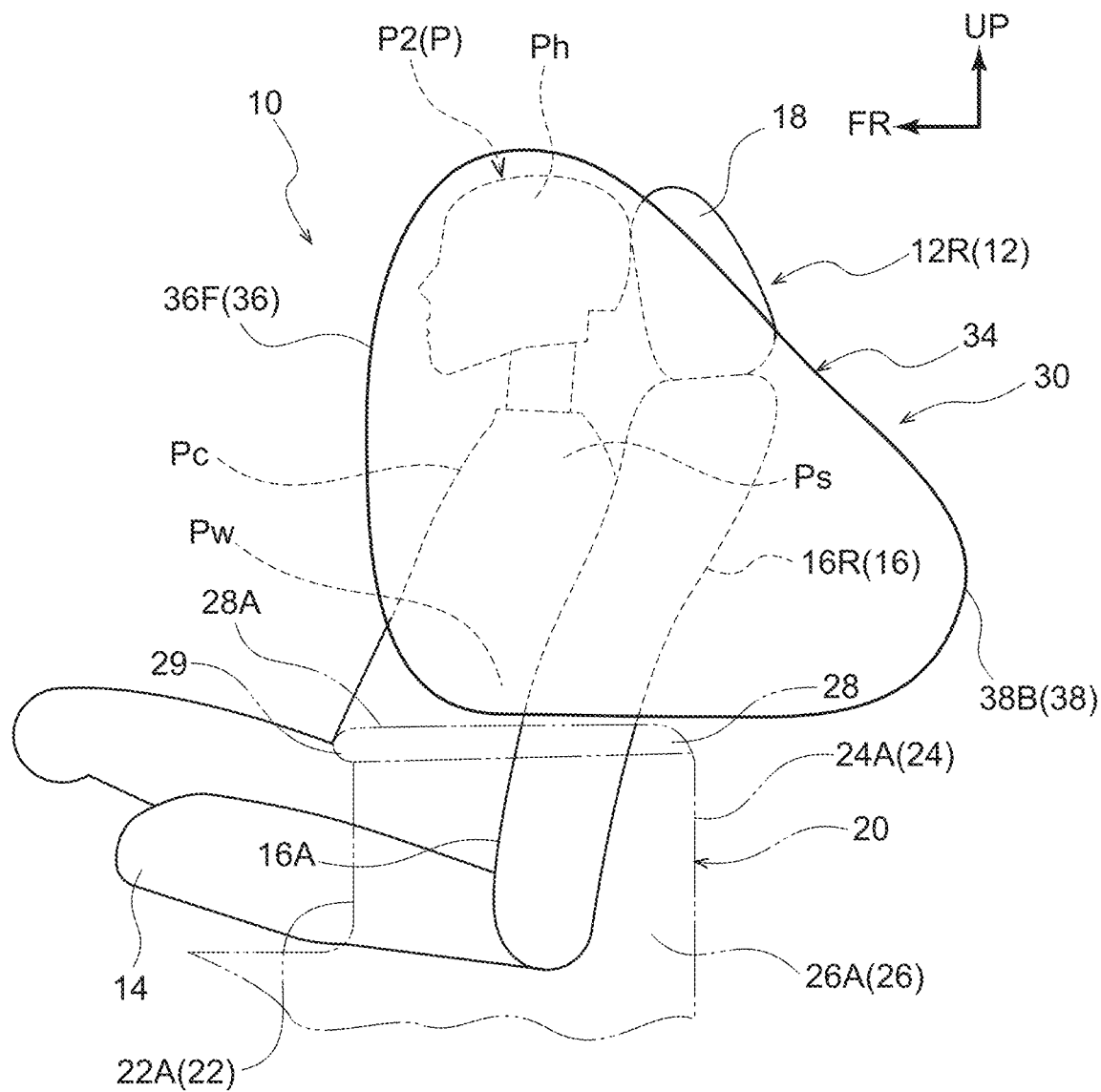
FIG. 2 is a schematic side view illustrating an inflated and deployed state of a far side airbag of a vehicle passenger restraint device according to the first exemplary embodiment when a seat is positioned at a furthest rearward position.

Moreover, "passenger P1" illustrated in FIG. 1 is, as an example, a small build passenger equivalent to an American adult female $5^{th}$ percentile (AF05) world side impact dummy (World SID). The "passenger P2" illustrated in FIG. 2 is, as an example, a large build passenger equivalent to an American adult male $95^{th}$ percentile (AM95) World SID. Note that in the following description reference will be made to "passenger P" when there is no need to discriminate between the small build passenger P1 and the large build passenger P2.

FIRST EXEMPLARY EMBODIMENT

First description follows regarding a first exemplary embodiment. As illustrated in FIG. 1 and FIG. 2, a vehicle seat 12 configured with a vehicle passenger restraint device 10 according to a first exemplary embodiment includes a seat cushion 14 for an passenger P to sit on (to support the buttocks and thighs of the passenger P), a seatback 16 to support the back of the passenger P, and a headrest 18 to support the head Ph of the passenger P.

In side view looking from the vehicle width direction (seat width direction), the seat cushion 14 extends in the front-rear direction, and the seatback 16 extends in a height direction and is coupled to a rear edge of the seat cushion 14 so as to be capable of swinging about an axial direction along the seat width direction. The headrest 18 is provided to a seat width direction central portion of an upper end portion of the seatback 16 so as to be capable of being raised or lowered. The passenger P is restrained in the vehicle seat 12 by a seatbelt device (omitted in the drawings).

Note that the vehicle seat 12 is, as an example, both a left and a right front seat configured so as to be capable of being respectively moved in the front-rear direction by a known electrical mechanism, and a vehicle equipped with these vehicle seats 12 in a vehicle cabin is, as an example, a right hand drive vehicle. Thus the vehicle seat 12 on the right side (hereafter referred to as "right seat 12R") is the driver's seat, and the vehicle seat 12 on the left side (hereinafter referred to as "left seat 12L") is the front passenger seat. Moreover, in the following description the letters "L" and "R" are appended to discriminate left and right for the seatbacks 16 of the left seat 12L and the right seat 12R.

Moreover, an example will be described for a case in which a vehicle side impact was an impact to a side face on the front passenger seat side (left side) of the vehicle. Namely, an example in which the front passenger seat side (left side) is the nearside. An example is accordingly employed in which a far side airbag device 30, described later, is provided on the driver's seat side. Namely, an example is employed in which the later-described far side airbag device 30 is provided to the seatback 16R of the right seat 12R (one-seat). Only the right seat 12R is accordingly illustrated in FIG. 1 and FIG. 2.

A console box 20 is provided to a floor of the vehicle cabin (omitted in the drawings) between the right seat 12R and the left seat 12L (see FIG. 3) (at a vehicle width direction center portion). The console box 20 is a rectangular shaped hollow box having a length direction along the front-rear direction in plan view. A front wall 22 and a rear wall 24 of the console box 20 respectively include a front face 22A and a rear face 24A that are each flat surfaces, and left and right side walls 26 of the console box 20 include side faces 26A that are each flat surfaces.

An upper portion of the console box 20 is an opening configured so as to be able to be opened and closed by a lid 28 having a specific thickness. Note that a front end portion of the lid 28 of the console box 20 is configured with an overlap portion 29 that projects out at a specific length further toward the front side than the front face 22A of the front wall 22 in side view. A height to an upper face 28A of the lid 28 of the console box 20 is a height sufficient for the passenger P to place their elbow (omitted in the drawings) on without adopting an awkward pose.

Moreover, as illustrated in FIG. 1, a state in which a front end face (end face at a position furthest forward) 16A at a lower side of a side portion (side support portion) of the seatback 16R is positioned further to a front side than the front face 22A of the front wall 22 of the console box 20 in side view is called a furthest forward position (front-most position) of the right seat 12R. This is, for example, when the right seat 12R is disposed at the furthest forward position for the small build passenger P1.

Moreover, as illustrated in FIG. 2, a state in which the front end face 16A at a lower side of a side portion of the seatback 16R is positioned further to a rear side than the front face 22A of the front wall 22 of the console box 20 in side view is called the furthest rearward position (rear-most position) of the right seat 12R. This is, for example, when the right seat 12R is disposed at the furthest rearward position for the large build passenger P2. Note that the furthest forward position and the furthest rearward position of the left seat 12L (other-seat) are defined in the same manner.

Figure 3:
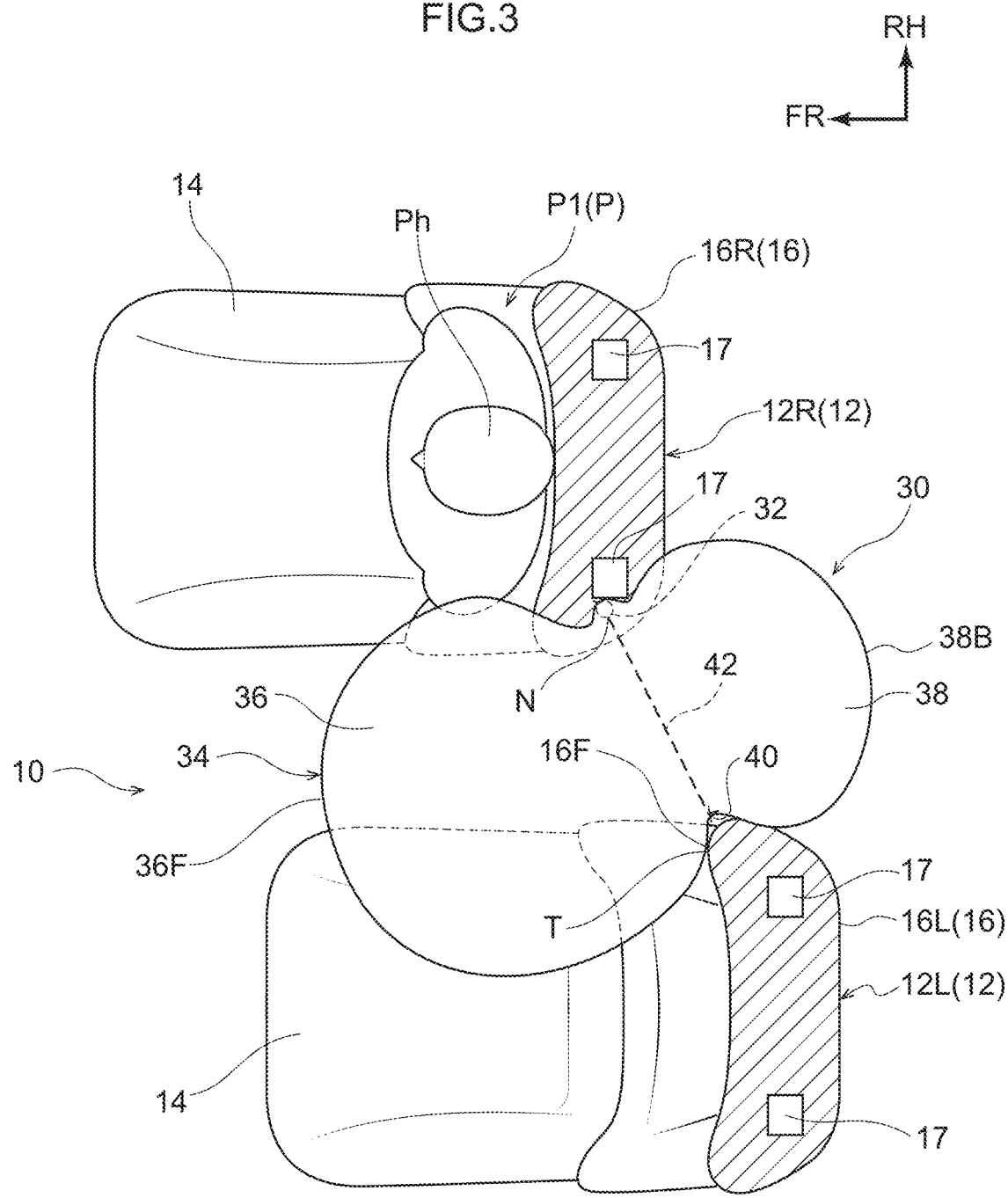
FIG. 3 is a schematic plan view illustrating an inflated and deployed state of a far side airbag of a vehicle passenger restraint device according to the first exemplary embodiment when a right seat is at a furthest forward position and a left seat is at a furthest rearward position.

The far side airbag device 30 is provided at a side portion on the left side (hereafter referred to as "left side portion") that is a vehicle width direction inside portion of the seatback 16R of the right seat 12R, and deploys at the vehicle width direction inside of the passenger P seated in the right seat 12R. As illustrated in FIG. 3, the far side airbag device 30 is configured including an inflator 32 embedded in a left side portion of the seatback 16R, and a far side airbag 34 internally supplied with gas ejected from the inflator 32.

The inflator 32 is a cylinder type gas generation device formed in a substantially circular cylinder shape, with the axial direction thereof oriented along a side frame 17 configuring a frame at left and right side portions of the seatback 16R (oriented in substantially the height direction). The inflator 32 is actuated when a vehicle side impact is either detected or predicted (hereafter referred to as "during a side impact"), and is capable of instantaneously supplying gas into the far side airbag 34.

As illustrated in FIG. 1 and FIG. 2, the far side airbag 34 is inflated and deployed at an upper side of the upper face 28A of the console box 20 by being internally supplied with gas ejected from the inflator 32. In side view the far side airbag 34 is a single body configured from a main chamber 36 covering at least from the waist Pw to the head Ph of the passenger P seated in the right seat 12R, and from a rear deployment section 38 that is deployed from a rear portion of the main chamber 36 to the rear side past the rear face of the seatback 16R.

The main chamber 36 is formed in a shape having a front wall 36F that bulges in a substantially circular arc shape toward the front side in side view, and is configured with a size capable of restraining left side faces at the vehicle width direction inside of at least the waist Pw, the chest Pc, the shoulder Ps, and the head Ph of the passenger P. The rear deployment section 38 is formed in a shape having a rear wall 38B that bulges in a substantially circular arc shape toward the rear side in side view. Note that the far side airbag 34 is formed in a single bag shape by sewing outer peripheral edges of two base cloths together.

Figure 4:
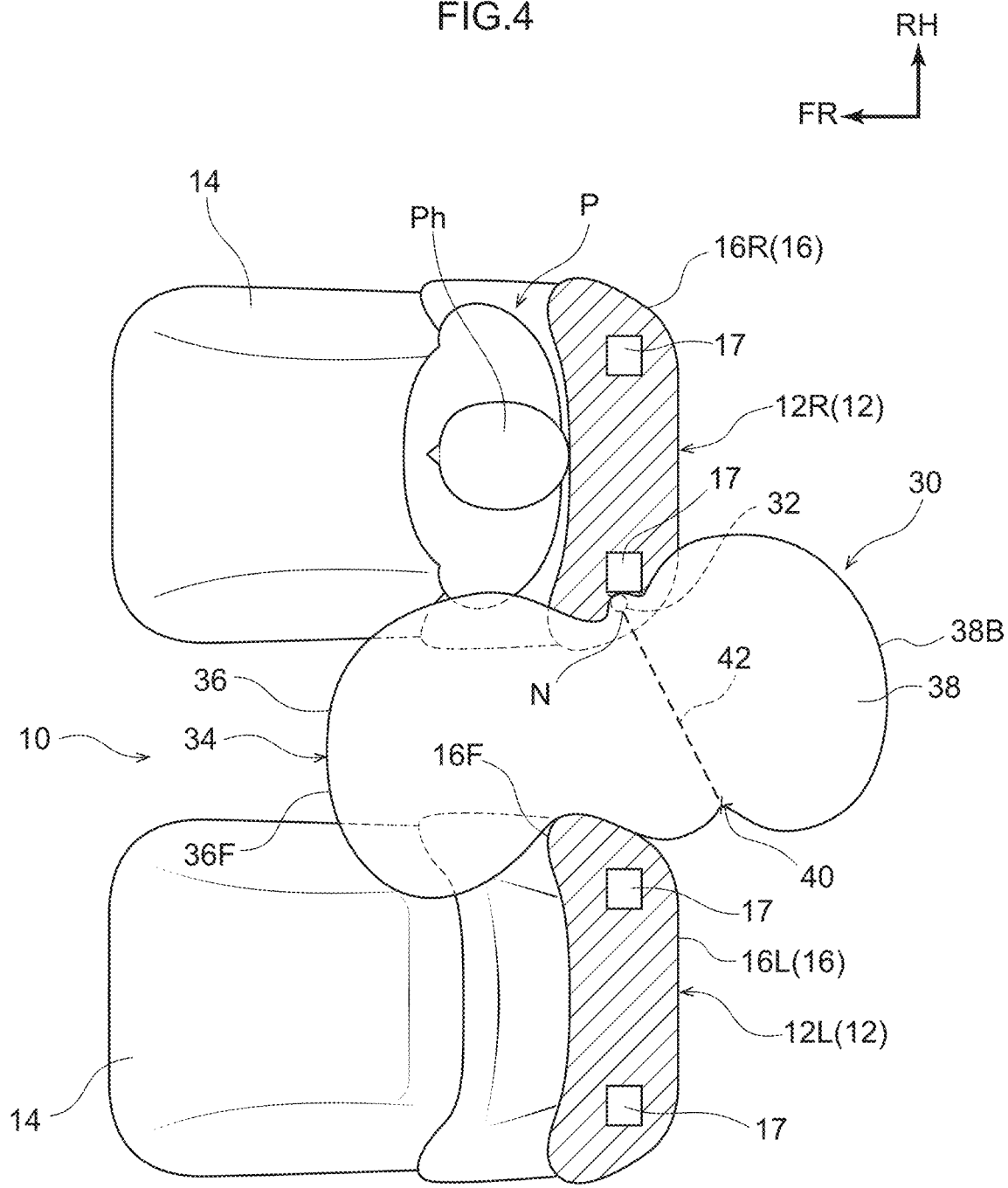
FIG. 4 is a schematic plan view illustrating an inflated and deployed state of a far side airbag of a vehicle passenger restraint device according to the first exemplary embodiment when both a right seat and a left seat are at the same position.
Figure 5:
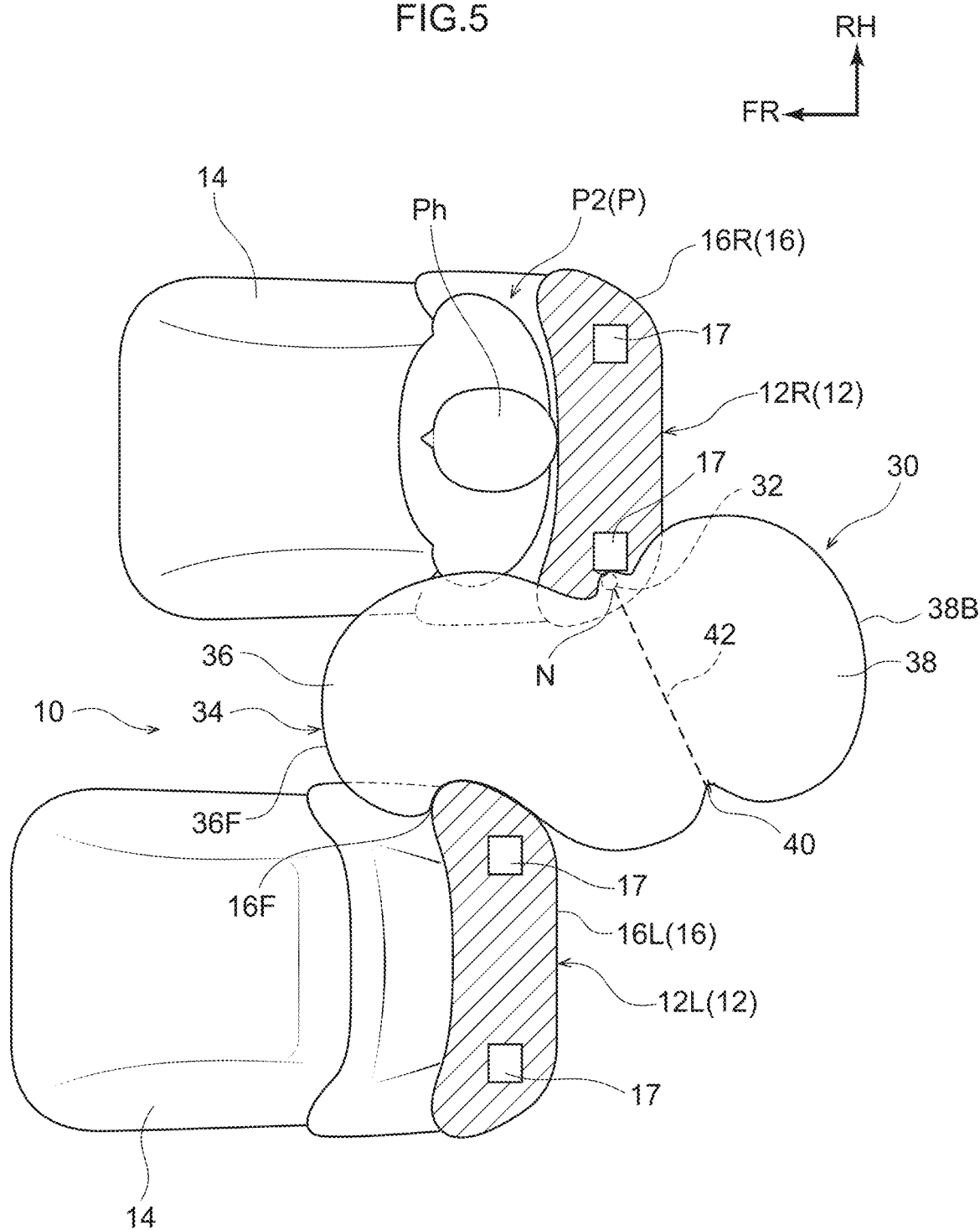
FIG. 5 is a schematic plan view illustrating an inflated and deployed state of a far side airbag of a vehicle passenger restraint device according to the first exemplary embodiment when a right seat is at a furthest rearward position and a left seat is at a furthest forward position.

Moreover, as illustrated in FIG. 3 to FIG. 5, the far side airbag 34 includes the main chamber 36 and the rear deployment section 38 integrally provided at a rear portion of the main chamber 36. This thereby enables an overlap to be achieved with the seatback 16L of the left seat 12L in side view even in cases in which the right seat 12R and the left seat 12L have been disposed so as to be displaced with respect to each other to the maximum extent in the front-rear direction (e.g. the right seat 12R is disposed at the furthest forward position and the left seat 12L is disposed at the furthest rearward position, such that there is the maximum displacement in the front-rear direction therebetween).

As illustrated in FIG. 3, in plan view the far side airbag 34 includes a step portion 40 in a vicinity of a contact point T of contact with a front end (site at the apex in plan view) 16F at an upper side of a side portion on the right side (hereafter referred to as "right side portion") at the vehicle width direction inside portion of the seatback 16L of the left seat 12L when the right seat 12R is disposed at the furthest forward position and the left seat 12L is disposed at the furthest rearward position.

Figure 6A:
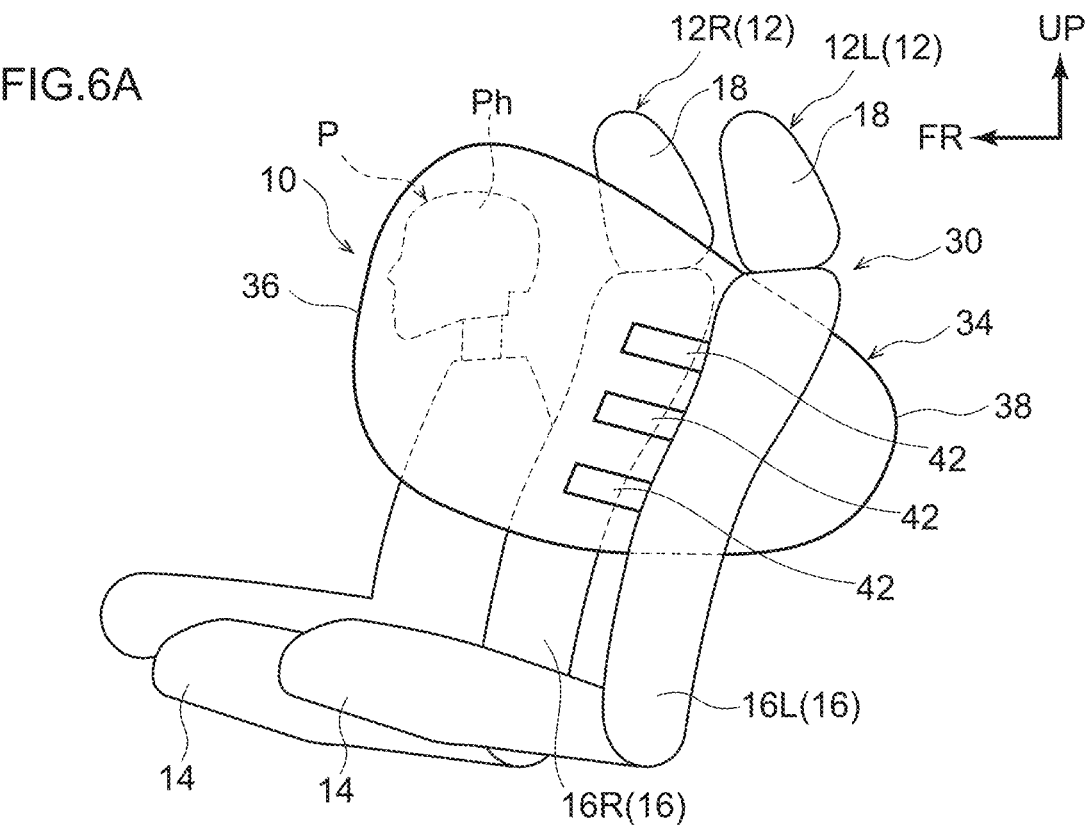
FIG. 6A is a schematic side view illustrating plural straps provided inside a far side airbag of a vehicle passenger restraint device according to the first exemplary embodiment.

As illustrated in FIG. 6A, the step portion 40 is formed by plural (for example three) straps 42 provided inside the far side airbag 34 so as to have length directions substantially along the left-right direction. Namely as illustrated in FIG. 3, the plural straps 42 are disposed so as to connect a proximity point N of the inflator 32 in the seatback 16R of the right seat 12R in a straight line in plan view to the front end 16F (including the vicinity of the front end 16F) at the upper side of a right side portion of the seatback 16L of the left seat 12L.

In a state in which tension from full inflation and deployment of the far side airbag 34 is acting in a substantially left-right direction, a length of the plural straps 42 along the substantially left-right direction is set so as to be a minimum distance between the left side portion of the seatback 16R of the right seat 12R disposed in the furthest forward position and the right side portion of the seatback 16L of the left seat 12L disposed in the furthest rearward position.

Note that the main chamber 36 is configured at the front side of the plural straps 42, and the rear deployment section 38 is configured at the rear side of the plural straps 42. The gas supplied into the main chamber 36 of the far side airbag 34 is configured so as to be supplied into the rear deployment section 38 through gaps at the upper side and the lower side of the plural straps 42 and between respective straps 42.

Figure 6B:
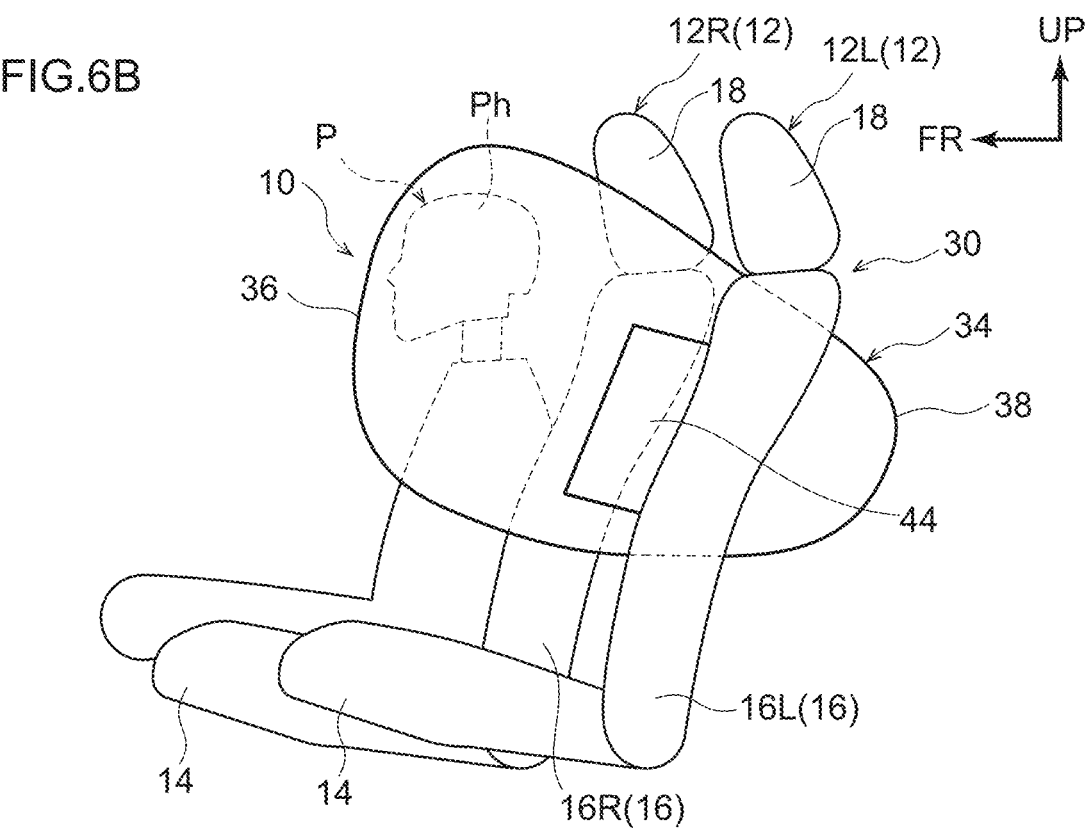
FIG. 6B is a schematic side view illustrating a single tether provided inside a far side airbag of a vehicle passenger restraint device according to the first exemplary embodiment.

Moreover as illustrated in FIG. 6B, the step portion 40 may be formed by a single tether 44 provided inside the far side airbag 34. Such a configuration with the tether 44 is similar to the configuration with the straps 42. In this case the gas supplied into the main chamber 36 of the far side airbag 34 is configured so as to be supplied into the rear deployment section 38 through gaps at the upper side and the lower side of the tether 44.

Next, description follows regarding operation of the vehicle passenger restraint device 10 according to the first exemplary embodiment configured as described above.

The inflator 32 is actuated during a side impact of the vehicle (more specifically an impact to the left side face of the vehicle), and gas ejected from the inflator 32 is supplied into the far side airbag 34 (the main chamber 36 and the rear deployment section 38). When this occurs, a cover spanning from an height direction substantially central portion to an upper portion of the left side portion of the seatback 16R of the right seat 12R is ruptured by the internal pressure (inflation pressure) of the far side airbag 34 that has started to be inflated by this supply of gas.

Namely, the far side airbag 34 is inflated and deployed further toward the upper side than the upper face 28A of the console box 20, and the main chamber 36 thereof is inflated and deployed toward the left side face (vehicle width direction inside) of the waist Pw, the chest Pc, the shoulder Ps, the head Ph of the passenger P. Thereby the left side face at least from the waist Pw to the head Ph of the passenger P is covered from the left side by the main chamber 36 in side view.

This means that during the vehicle side impact, the left side face at least from the waist Pw to the head Ph of the passenger P can be restrained by the main chamber 36. Moreover, the far side airbag 34 is able to avoid being effected by reaction force from the console box 20, and so a consistent inflation and deployment position can be maintained for the far side airbag 34. This thereby enables the main chamber 36 to exhibit the desired restraint force on the passenger P.

Moreover, slightly delayed from the inflation and deployment of the main chamber 36, the rear deployment section 38 passes the rear face of the seatback 16R and is inflated and deployed toward the rear side. The right seat 12R takes up the furthest forward position and the left seat 12L takes up the furthest rearward position when, as illustrated in FIG. 3 for example, the passenger P seated in the driver's seat is the small build passenger P1 and the passenger P seated in the front passenger seat is the large build passenger P2 (omitted in the drawings).

However, the far side airbag 34 includes the rear deployment section 38 integrated to a rear portion of the main chamber 36, and is able to achieve an overlap in side view with the seatback 16L of the left seat 12L. Namely, the far side airbag 34 is able to obtain reaction force from the seatback 16L of the left seat 12L.

Moreover, as illustrated in FIG. 3, in plan view the step portion 40 is formed in the vicinity of the contact point T where the far side airbag 34 contacts the right side portion front end 16F of the seatback 16L of the left seat 12L when the right seat 12R is disposed at the furthest forward position and the left seat 12L is disposed at the furthest rearward position. This enables the far side airbag 34 to obtain effective reaction force from the seatback 16L of the left seat 12L.

More specifically, during a vehicle side impact, the passenger P1 moves under inertia toward the vehicle width direction inside and presses the far side airbag 34 toward the left seat 12L. When this occurs the far side airbag 34 attempts to rotate toward the vehicle width direction inside about the rear end portion of the far side airbag 34 in plan view. However, due to the step portion 40 formed to the far side airbag 34 hooking onto the right side portion of the seatback 16L of the left seat 12L when this is occurs, the far side airbag 34 can obtain an effective reaction force from the seatback 16L of the left seat 12L.

A rotational behavior of the far side airbag 34 toward the vehicle width direction inside is accordingly suppressed, and the movement amount (displacement amount) thereof toward the vehicle width direction inside is reduced. In this manner, the passenger P1 is able to be effectively restrained by the far side airbag 34 (restraining performance for the passenger P1 can be secured) even when the right seat 12R takes up the furthest forward position and the left seat 12L takes up the furthest rearward position (the right seat 12R and the left seat 12L are disposed with the maximum front-rear direction displacement from each other).

Note that, for example as illustrated in FIG. 4, sometimes the right seat 12R takes up a standard position (neutral position) at a front-rear direction substantially central portion, and the left seat 12L takes up a standard position (neutral position) at a front-rear direction substantially central portion (i.e. the right seat 12R and the left seat 12L are disposed at the same position as each other in the front-rear direction) when the passenger P seated in the driver's seat and the passenger P seated in the front passenger seat (omitted in the drawings) are both standard build passengers P.

However, the far side airbag 34 is able to achieve an overlap with the seatback 16L of the left seat 12L in side view in such cases too. Namely, the far side airbag 34 is able to obtain effective reaction force from the seatback 16L of the left seat 12L, and the passenger P can be effectively restrained (the restraining performance for the passenger P1 can be secured) even in such cases.

Moreover, for example as illustrated in FIG. 5, the right seat 12R takes up the furthest rearward position and the left seat 12L takes up the furthest forward position (the right seat 12R and the left seat 12L are disposed with the maximum front-rear direction displacement from each other) when the passenger P seated in the driver's seat is the large build passenger P2, and the passenger P seated in the front passenger seat is the small build passenger P1 (omitted in the drawings).

However, the far side airbag 34 can achieve an overlap with the seatback 16L of the left seat 12L in side view even in such cases. Namely, the far side airbag 34 is able to obtain effective reaction force from the seatback 16L of the left seat 12L even in such cases, enabling effective restraining of the passenger P2 (enabling restraining performance for the passenger P2 to be secured).

Moreover, the step portion 40 described above is formed by the plural straps 42 or the single tether 44 provided inside the far side airbag 34. This enables implementation with a simple configuration of forming the step portion 40 to the far side airbag 34.

Moreover, the plural straps 42 or the single tether 44 are disposed so as to connect the proximity point N of the inflator 32 in the seatback 16R of the right seat 12R to the right side portion front end 16F of the seatback 16L of the left seat 12L in plan view. The length of the plural straps 42 or of the single tether 44 when in a state in which tension is acting from full inflation and deployment of the far side airbag 34 is set so as to be the minimum distance between the left side portion of the seatback 16R of the right seat 12R disposed in the furthest forward position and the right side portion of the seatback 16L of the left seat 12L disposed in the furthest rearward position.

This means that the step of the step portion 40 of the far side airbag 34 can be maximized, facilitating the step portion 40 hooking onto the right side portion of the seatback 16L of the left seat 12L. Namely, due to adopting such a configuration, the far side airbag 34 is able to obtain more effective reaction force from the seatback 16L of the left seat 12L, enabling more effective restraint of the passenger P.

SECOND EXEMPLARY EMBODIMENT

Next, description follows regarding a second exemplary embodiment. Note that the same reference numerals will be appended to equivalent sites to those of the first exemplary embodiment and detailed explanation thereof (including of common operation) will be omitted.

Figure 8:
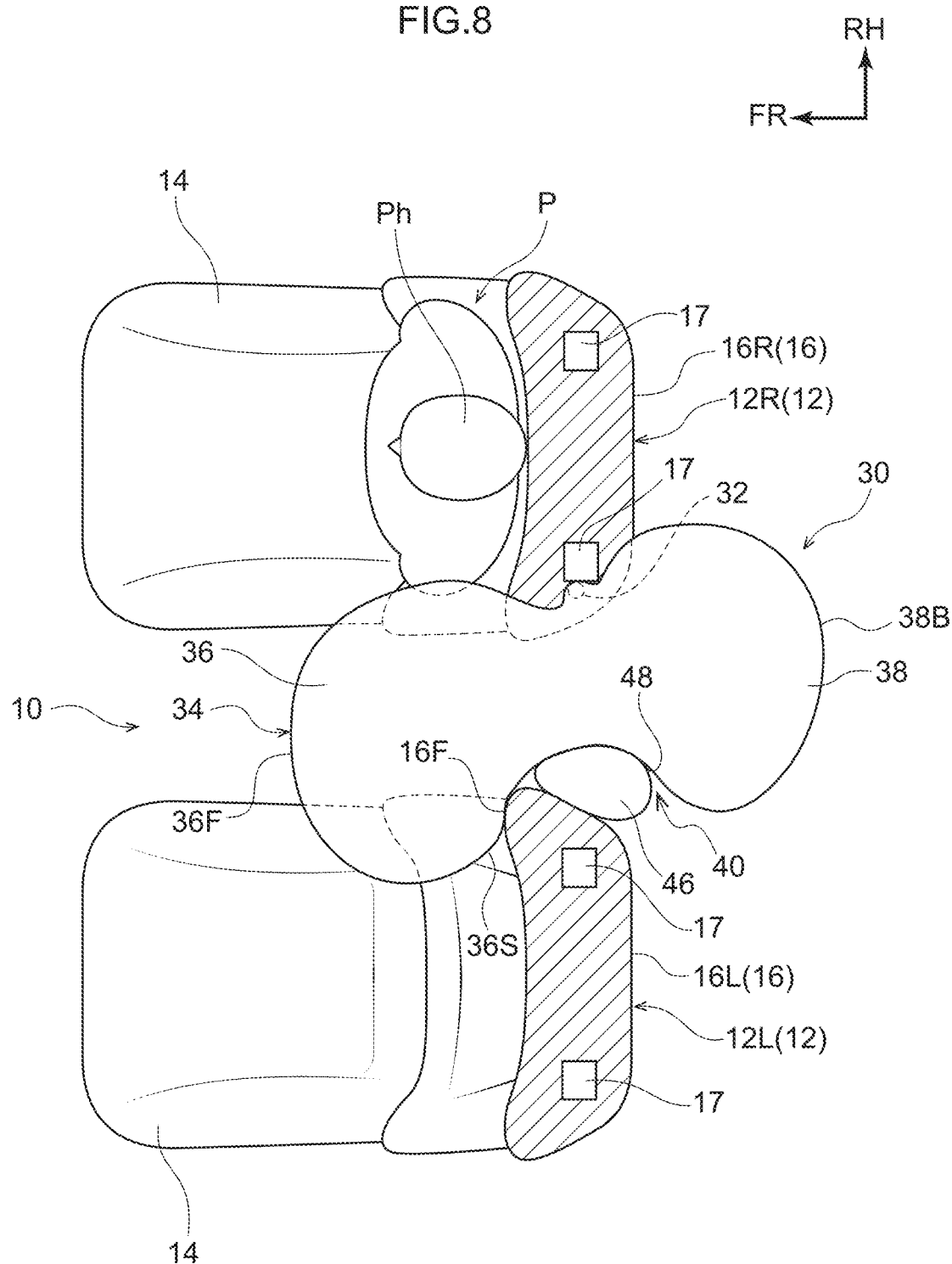
FIG. 8 is a schematic plan view illustrating an inflated and deployed state of a far side airbag of a vehicle passenger restraint device according to the second exemplary embodiment when a right seat and a left seat are positioned at the same position.
Figure 9:
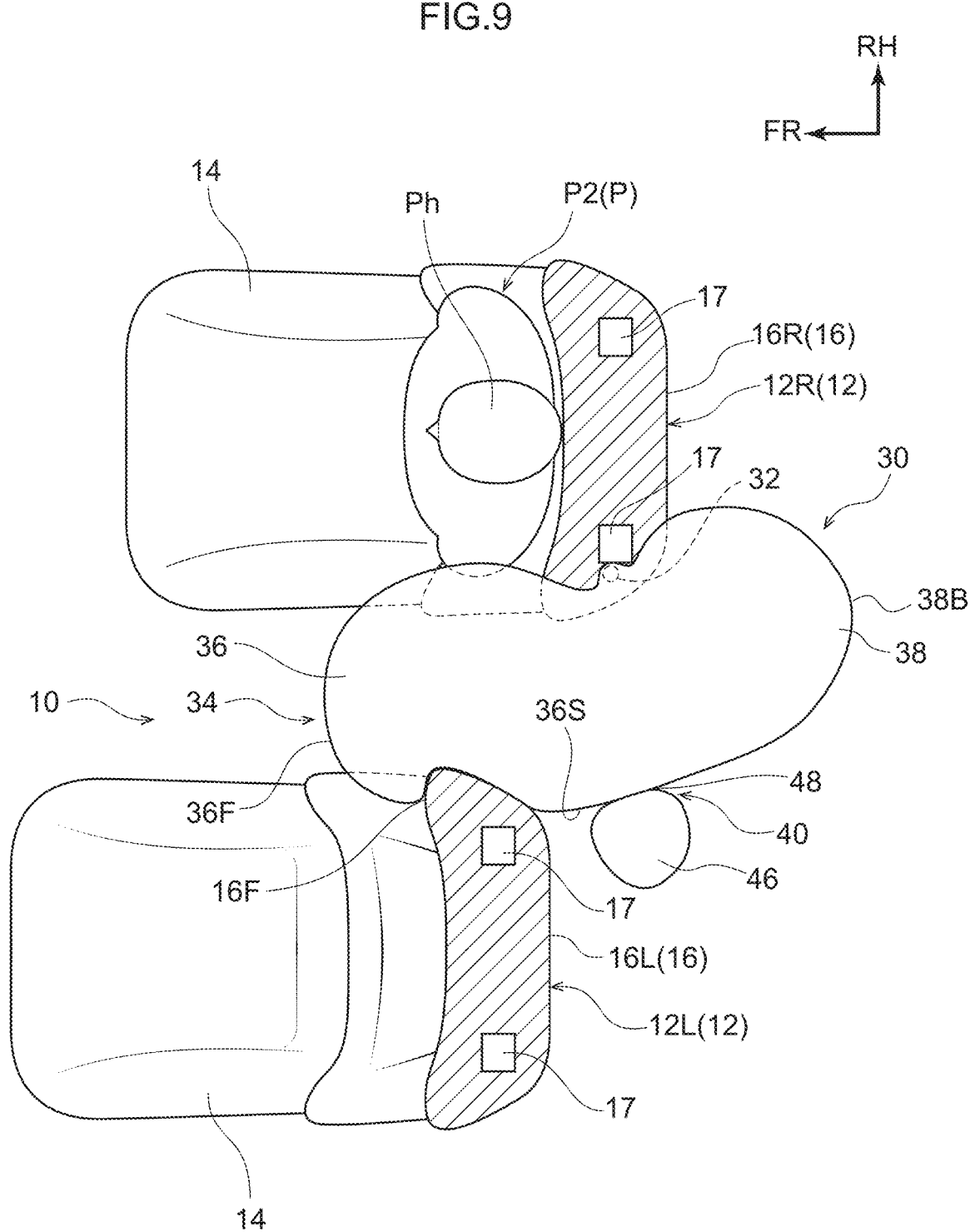
FIG. 9 is a schematic plan view illustrating an inflated and deployed state of a far side airbag of a vehicle passenger restraint device according to the second exemplary embodiment when a right seat is at a furthest rearward position and a left seat is at a furthest forward position.

As illustrated in FIG. 7 to FIG. 9, the second exemplary embodiment differs from the first exemplary embodiment in that the step portion 40 described above is formed at a vehicle width direction inside of the main chamber 36 configuring the far side airbag 34 by forming a sub chamber 46 provided so as to be in communication with the main chamber 36.

More specifically, the sub chamber 46 is formed so as to have a substantially circular shaped profile in plan view after inflation and deployment, and is provided by being sewed to a front-rear direction substantially central portion at the vehicle width direction inside of the main chamber 36. Namely, a circular shaped communication hole (omitted in the drawings) having a specific internal diameter is formed to a front-rear direction substantially central portion of the vehicle width direction inside of the main chamber 36, and peripheral edge portions of a circular shaped communication hole (omitted in the drawings) having a specific internal diameter formed to the sub chamber 46 are sewn to the peripheral edge portions of the communication hole of the main chamber 36.

The sub chamber 46 is thereby integrally connected to the main chamber 36, such that gas from the main chamber 36 passes through these communication holes and is supplied into the sub chamber 46. Namely, the sub chamber 46 is configured so as to be inflated and deployed slightly delayed from the main chamber 36.

Then when, for example as illustrated in FIG. 7, the right seat 12R is disposed in the furthest forward position and the left seat 12L is disposed in the furthest rearward position, such as when the passenger P seated in the driver's seat is the small build passenger P1 and the passenger P seated in the front passenger seat is the large build passenger P2 (omitted in the drawings), a boundary portion (valley) 48 between a rear wall 46B serving as a rear side portion of the sub chamber 46 and a side wall 36S serving as a vehicle width direction inside portion of the main chamber 36 is disposed at the right side portion front end 16F (including in the vicinity of the front end 16F) of the seatback 16L of the left seat 12L.

This means that during a vehicle side impact, even when the small build passenger P1 moves under inertia toward the vehicle width direction inside and presses the far side airbag 34 toward the left seat 12L, and the far side airbag 34 attempts to rotate about its rear end portion toward the vehicle width direction inside in plan view, the step portion 40 formed to the far side airbag 34, namely the sub chamber 46, readily hooks onto the right side portion of the seatback 16L of the left seat 12L, and the far side airbag 34 is able to obtain effective reaction force from the seatback 16L of the left seat 12L.

Thus rotational behavior of the far side airbag 34 toward the vehicle width direction inside is suppressed, and the movement amount (displacement amount) thereof toward the vehicle width direction inside is reduced. Thus the second exemplary embodiment is able to effectively restrain the passenger P1 using the far side airbag 34 (is able to secure restraining performance for the passenger P1) even when the right seat 12R takes up the furthest forward position and the left seat 12L at the furthest rearward position (even when the right seat 12R and the left seat 12L are disposed displaced from each other to the maximum extend in the front-rear direction).

Note that in the second exemplary embodiment, when the right seat 12R is disposed at the furthest forward position and the left seat 12L is disposed at the furthest rearward position, a front side of an imaginary straight line (omitted in the drawings) connecting the inflator 32 of the seatback 16R of the right seat 12R in a straight line in plan view to the boundary portion 48 configures the main chamber 36 and a rear side of the imaginary straight line configures the rear deployment section 38. The boundary portion 48 is accordingly part of the main chamber 36.

Moreover, for example as illustrated in FIG. 8, sometimes the right seat 12R takes up the standard position at a front-rear direction substantially central portion and the left seat 12L also takes up the standard position at a front-rear direction substantially central portion (i.e. the right seat 12R and the left seat 12L are disposed at the same position as each other in the front-rear direction) when the passenger P seated in the driver's seat and the passenger P seated in the front passenger seat (omitted in the drawings) are both standard build passengers P. Operation and advantageous effects in such cases are similar to those of the first exemplary embodiment.

Furthermore, for example as illustrated in FIG. 9, the right seat 12R takes up the furthest rearward position and the left seat 12L takes up the furthest forward position (e.g. the right seat 12R and the left seat 12L are disposed with the maximum front-rear direction displacement from each other) when the passenger P seated in the driver's seat is the large build passenger P2 and the passenger P seated in the front passenger seat is the small build passenger P1 (omitted in the drawings). Operation and advantageous effects in such cases are also similar to those of the first exemplary embodiment.

In each of these cases, the sub chamber 46 configured in such a manner enables implementation with a simple configuration by forming the step portion 40 to the far side airbag 34. The size of the step of the step portion 40 of the far side airbag 34 can also be easily set larger than in the first exemplary embodiment by appropriately setting a volume of the sub chamber 46, enabling the step portion 40 to even more easily hook onto the right side portion of the seatback 16L of the left seat 12L. Namely, in the far side airbag 34 more effective reaction force can be obtained from the seatback 16L of the left seat 12L, enabling more effective restraint of the passenger P.

Figure 10:
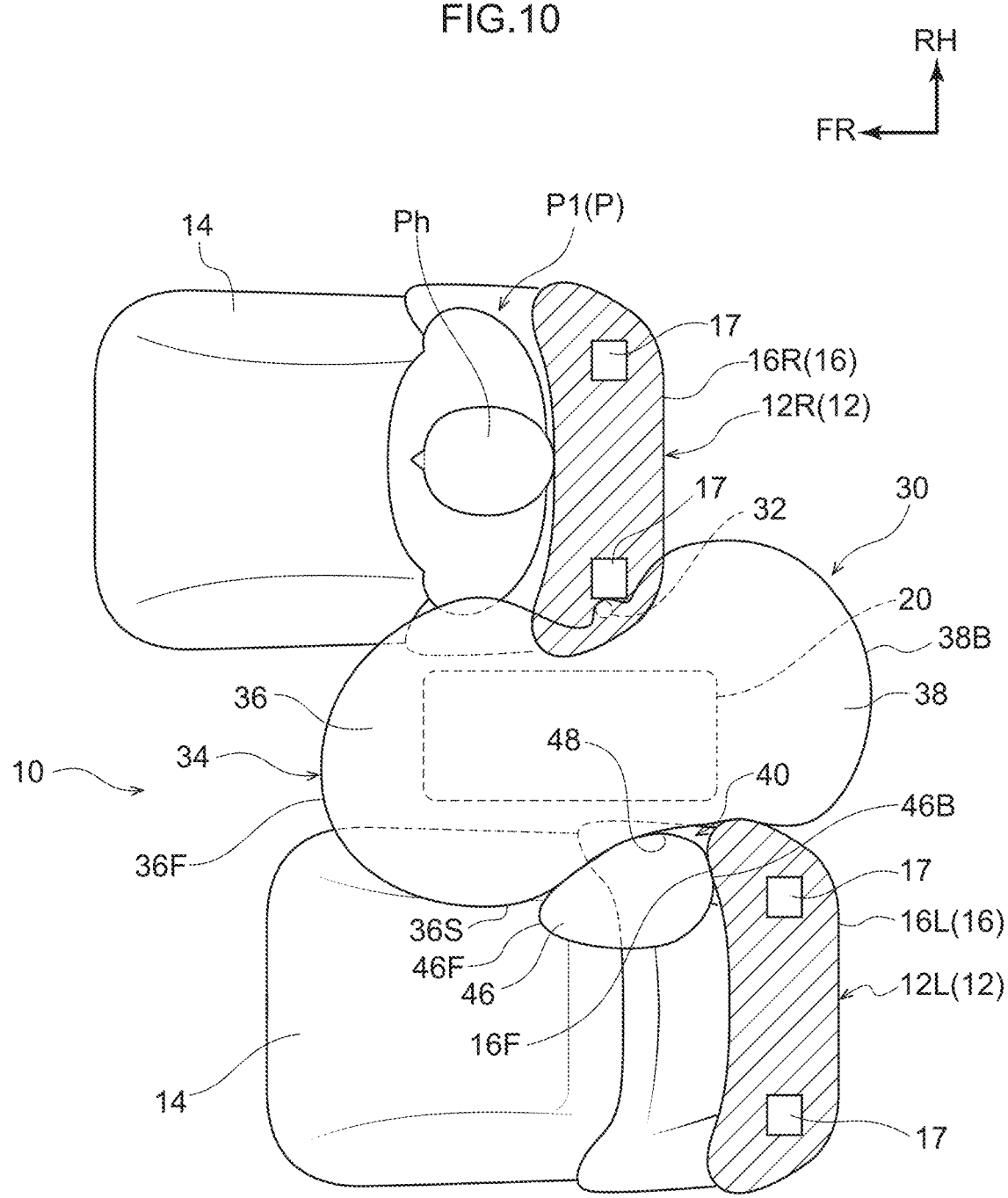
FIG. 10 is a schematic plan view illustrating an inflated and deployed state of a far side airbag of a vehicle passenger restraint device according to a first modified example of the second exemplary embodiment when a right seat is at a furthest forward position and a left seat is at a furthest rearward position.

Note that the shape of the sub chamber 46 after inflation and deployment is not limited to the shapes illustrated in FIG. 7 to FIG. 9. For example, as illustrated in FIG. 10, the shape in plan view of the sub chamber 46 after inflation and deployment may be formed as a so-called drop shape (teardrop shape) having a substantially acute angle pointed shape on a front wall 46F side thereof and a substantially circular arc shape on a rear wall 46B side thereof.

Moreover, as illustrated in FIG. 11A, in plan view the length of the sub chamber 46 along the front-rear direction may be substantially the same as the length of the main chamber 36 along the front-rear direction. Moreover, as illustrated in FIG. 11B, in plan view the length of the sub chamber 46 along the front-rear direction may be substantially the same as the length of the main chamber 36 along the front-rear direction, and the thickness along a substantially left-right direction at the front side of the main chamber 36 and the sub chamber 46 may be configured so as to be reduced compared to that illustrated in FIG. 11A.

Figure 12A:
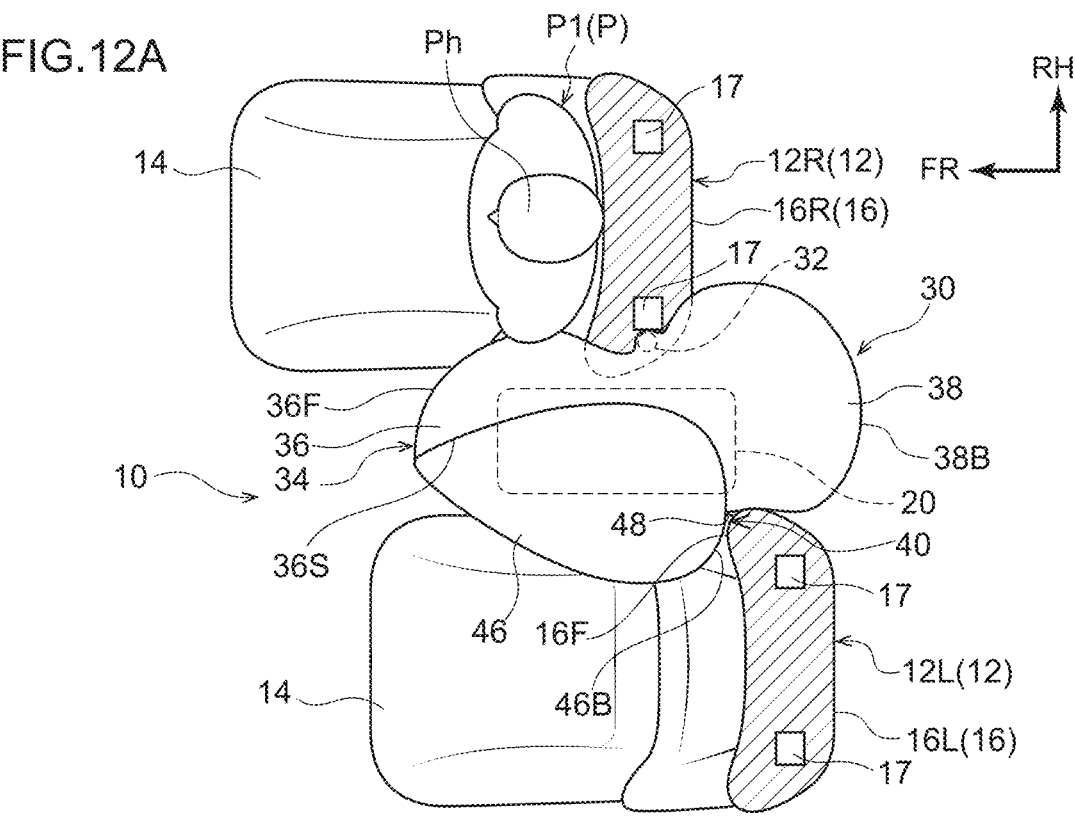
FIG. 12A and FIG. 12B are schematic plan views illustrating respective inflated and deployed states of far side airbags of a vehicle passenger restraint device according to a third modified example of the second exemplary embodiment when a right seat is at a furthest forward position and a left seat is at a furthest rearward position.
Figure 12B:
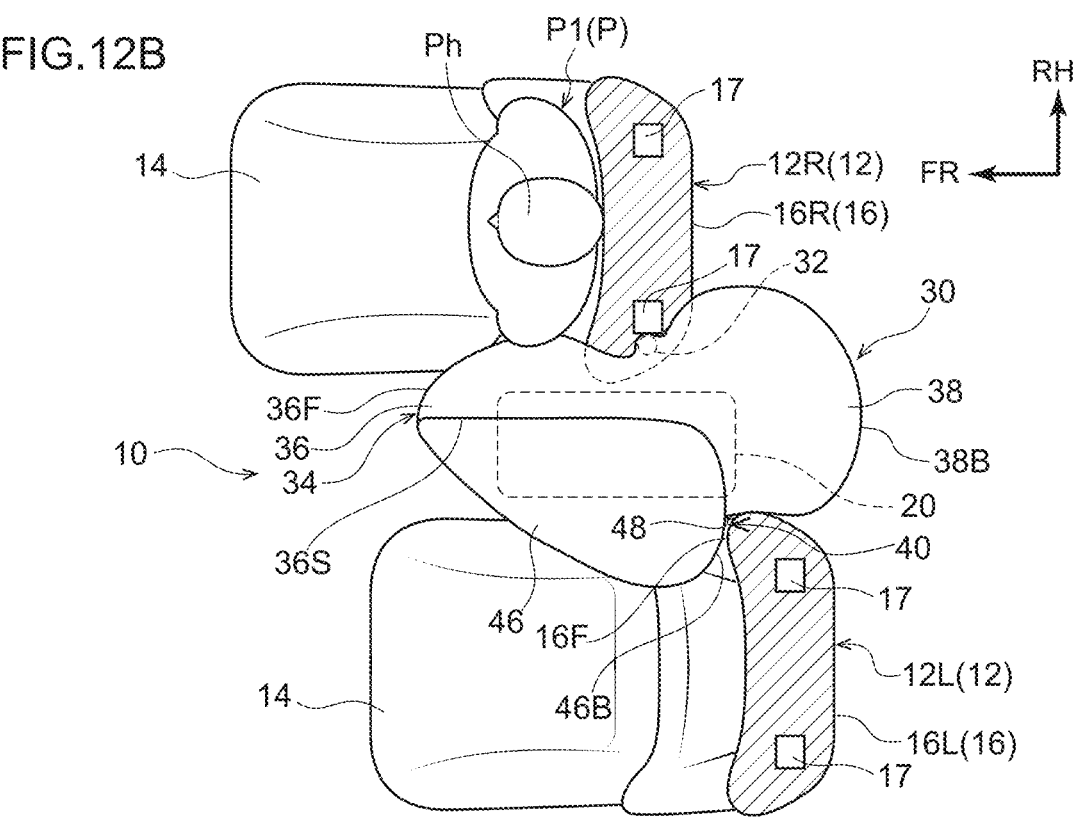

Moreover, as illustrated in FIG. 12A, in plan view the volume of the sub chamber 46 may be configured so as to be larger than the volume of the main chamber 36. Moreover, as illustrated in FIG. 12B, the volume of the sub chamber 46 may be larger than the volume of the main chamber 36 and also the thickness in plan view along a substantially left-right direction may be configured so as to be reduced at the front side of the main chamber 36 and the sub chamber 46 compared to that illustrated in FIG. 12A.

In each of these cases the main chamber 36 and the sub chamber 46 configured as illustrated in FIG. 11A, FIG. 11B, FIG. 12A, and FIG. 12B enable the restraint force on the passenger P seated in the driver's seat and on the passenger P seated in the front passenger seat (omitted in the drawings) to be adjusted (enable the internal pressure of the main chamber 36 for restraining the passenger P and the internal pressure of the sub chamber 46 to be adjusted).

Moreover, as illustrated in FIG. 13A, in side view the length of the sub chamber 46 along the height direction and the length of the main chamber 36 along the height direction may be substantially the same as each other. Accordingly, by being able to increase a contact length with the seatback 16L of the left seat 12L compared to a standard size and shape sub chamber 46 as illustrated in FIG. 13C, the reaction force on the far side airbag 34 can be increased, enabling the restraint force on the passenger P to be raised.

Moreover as illustrated in FIG. 13B, the sub chamber 46 may be formed with a minimum necessary circular shape in side view. Namely, the sub chamber 46 may be formed in a spherical shape having a minimum necessary volume. Adopting such an approach enables output of the inflator 32 to be reduced compared to cases in which the sub chamber 46 has a standard size and shape as illustrated in FIG. 13C. Note that the sub chamber 46 having the standard size and shape as illustrated in FIG. 13C is formed in a substantially oval shape having a length along substantially the height direction that is slightly longer than a length along substantially the front-rear direction in side view.

Moreover, as illustrated in FIG. 13D, the size of the sub chamber 46 may be made substantially the same as the size of the main chamber 36 in side view, as illustrated in FIG. 13D. Adopting such an approach enables the passenger P seated in the front passenger seat (omitted in the drawings) to be restrained by the sub chamber 46 in a substantially equivalent manner to the passenger P seated in the driver's seat.

Moreover, as illustrated in FIG. 13E, the sub chamber 46 may be formed in a substantially equilateral triangle shape in side view. More specifically, the rear wall 46B of the sub chamber 46 may be formed in a substantially equilateral triangle shape having circular arc shaped sides in side view. In such cases the sub chamber 46 can be formed at the minimum necessary size (the volume thereof can be reduced) with a circular arc shape of such curvature while still securing a better contact length with the seatback 16L of the left seat 12L than cases in which the sub chamber 46 is formed in a circular arc shape in side view.

THIRD EXEMPLARY EMBODIMENT

Next, description follows regarding a third exemplary embodiment. Note that the same reference numerals will be appended to locations equivalent to those of the first exemplary embodiment and the second exemplary embodiment, and detailed explanation thereof will be omitted (including of common operation).

Figure 14:
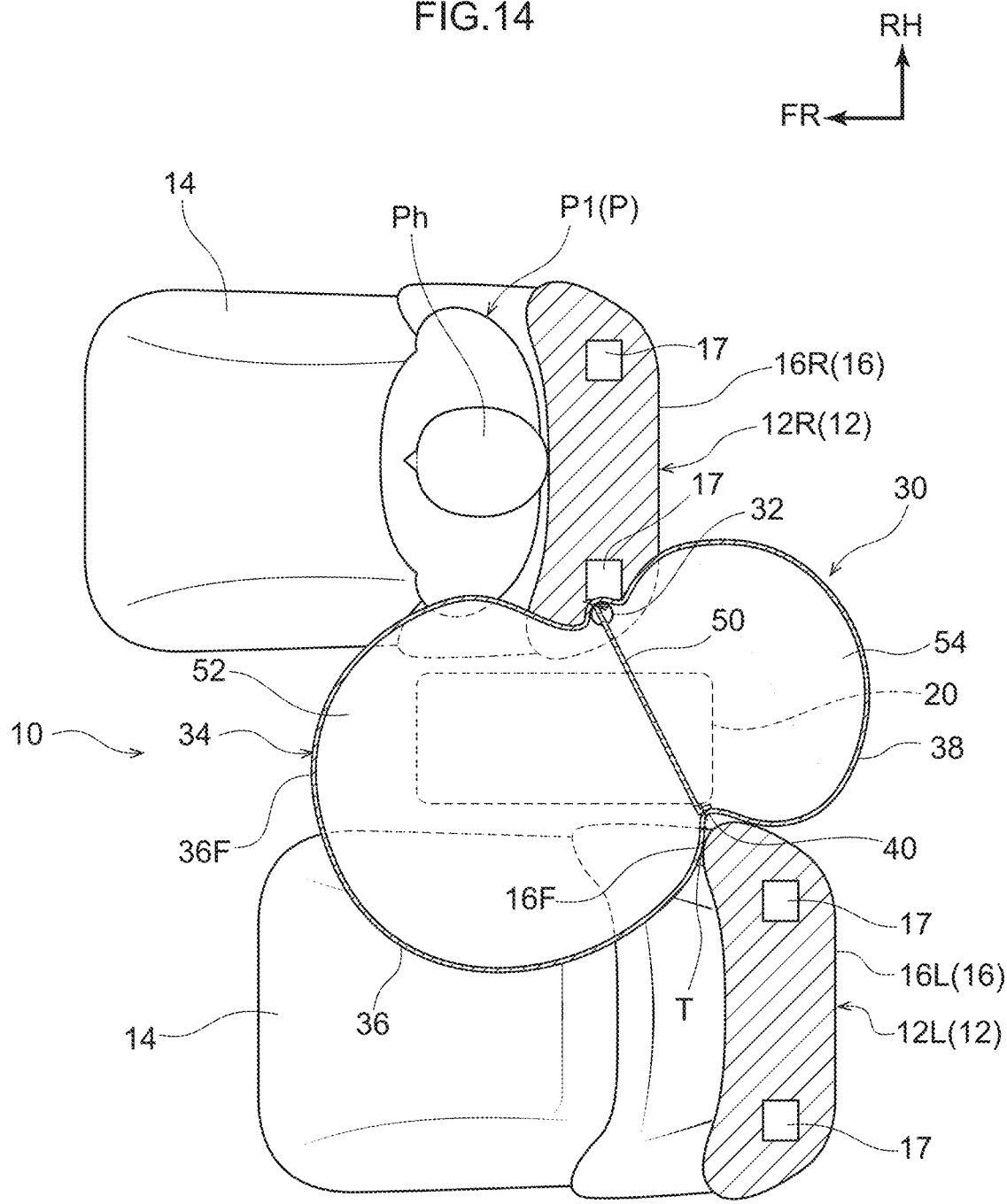
FIG. 14 is a schematic plan view illustrating a partial cross-section of an inflated and deployed state of a far side airbag of a vehicle passenger restraint device according to a third exemplary embodiment when a right seat is at a furthest forward position and a left seat is at a furthest rearward position.

As illustrated in FIG. 14, the third exemplary embodiment differs from the first exemplary embodiment in that the far side airbag 34 includes a front chamber 52 and a rear chamber 54 partitioned front-and-rear by a partitioning cloth 50. Note that the front chamber 52 configures the main chamber 36, and the rear chamber 54 configures the rear deployment section 38. Namely, the far side airbag 34 is configured so as to be partitioned by the partitioning cloth 50 into the main chamber 36 and the rear deployment section 38.

Gas ejected from the inflator 32 passes through a communication hole (omitted in the drawings) formed in the partitioning cloth 50 from either the front chamber 52 or the rear chamber 54, in a configuration such that the gas is supplied from one out of the front chamber 52 or the rear chamber 54 to the other thereof. This thereby enables the pressures (internal pressures) of the front chamber 52 and the rear chamber 54 to be adjusted by appropriately setting a size of the communication hole formed in the partitioning cloth 50, for example the internal diameter for a circular shaped communication hole.

Namely, the pressure (internal pressure) of the front chamber 52 mainly restraining the passenger P, and the pressure (internal pressure) of the rear chamber 54 mainly obtaining reaction force from the seatback 16L of the left seat 12L, can be adjusted. Note that a configuration may be adopted in which gas ejected from the inflator 32 is supplied at the same time to both the front chamber 52 and the rear chamber 54. In such cases, the pressure (internal pressure) of the front chamber 52 and the pressure (internal pressure) of the rear chamber 54 can be adjusted by adjusting the amount of gas supplied to the front chamber 52 and the rear chamber 54.

Figure 15:
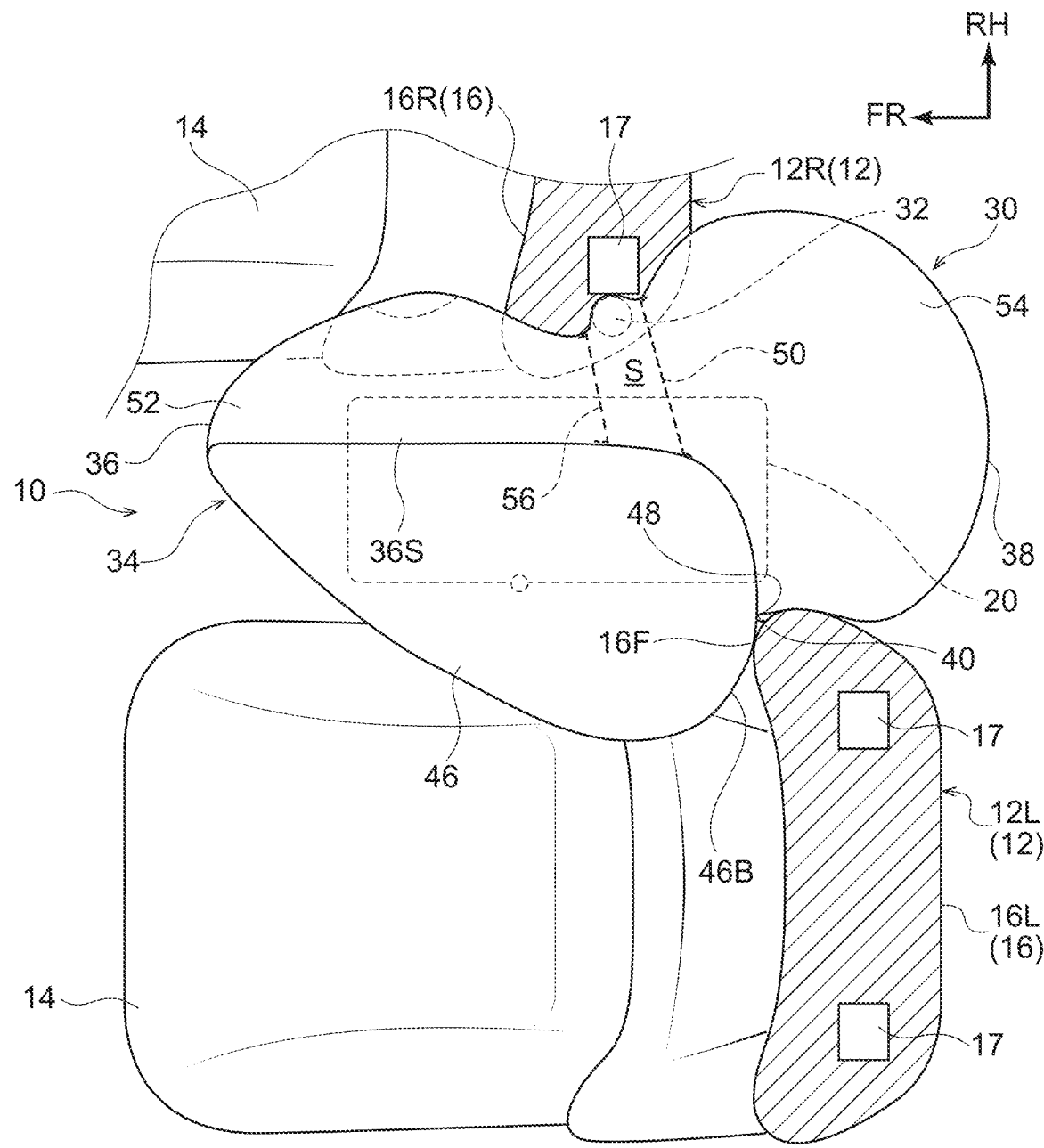
FIG. 15 is an schematic plan view illustrating an enlargement of an inflated and deployed state of a far side airbag of a vehicle passenger restraint device according to a modified example of the third exemplary embodiment when a right seat is at a furthest forward position and a left seat is at a furthest rearward position.

Moreover, as illustrated in FIG. 15, the far side airbag 34 may be configured including a sub chamber 46 that is provided at a vehicle width direction inside of the main chamber 36 configured by a front chamber 52 and that is in communication with the main chamber 36 (with the front chamber 52). In such cases a configuration is adopted in which the gas ejected from the inflator 32 is supplied directly into the sub chamber 46.

More specifically, a partitioning cloth 56 including a communication hole (omitted in the drawings) is also provided at a front side of the partitioning cloth 50, in a configuration such that gas ejected from the inflator 32 is supplied into a space S between the partitioning cloth 50 and the partitioning cloth 56. Communication holes (omitted in the drawings) for communicating with the main chamber 36 and the sub chamber 46 are also formed so as to face onto the space S between the partitioning cloth 50 and the partitioning cloth 56.

The gas ejected from the inflator 32 into the space S is thereby supplied to the front chamber 52 through the communication hole formed in the partitioning cloth 56, and is supplied to the rear chamber 54 through the communication hole formed in the partitioning cloth 50. The gas ejected from the inflator 32 into the space S is supplied into the sub chamber 46 through the communication hole of the main chamber 36 and through the communication hole of the sub chamber 46. This thereby enables the pressure (internal pressure) of the sub chamber 46 to also be adjusted together with those of the front chamber 52 and the rear chamber 54 by appropriately setting the sizes of these communication holes.

Note that the far side airbag 34 illustrated in FIG. 15 is configured such that part of a right seat 12R side (space S side) of the boundary portion 48 in plan view functions as the partitioning cloth 50 at the rear wall 46B of the sub chamber 46. A rear side of the part of the rear wall 46B of the sub chamber 46 and a rear side of the partitioning cloth 50 accordingly configure the rear chamber 54 that becomes the rear deployment section 38.

Moreover when the right seat 12R is disposed at the furthest forward position and the left seat 12L is disposed at the furthest rearward position, the boundary portion 48 between the rear wall 46B of the sub chamber 46 and the side wall 36S of the main chamber 36 is also disposed in plan view at the right side portion front end 16F (including in the vicinity of the front end 16F) of the seatback 16L of the left seat 12L in this far side airbag 34 also (see FIG. 15). The sub chamber 46 accordingly readily hooks onto the right side portion of the seatback 16L of the left seat 12L, enabling the far side airbag 34 to obtain effective reaction force from the seatback 16L of the left seat 12L.

Far Side Airbag Folding Method

Finally description follows regarding a folding method of the far side airbag 34.

Figure 16:
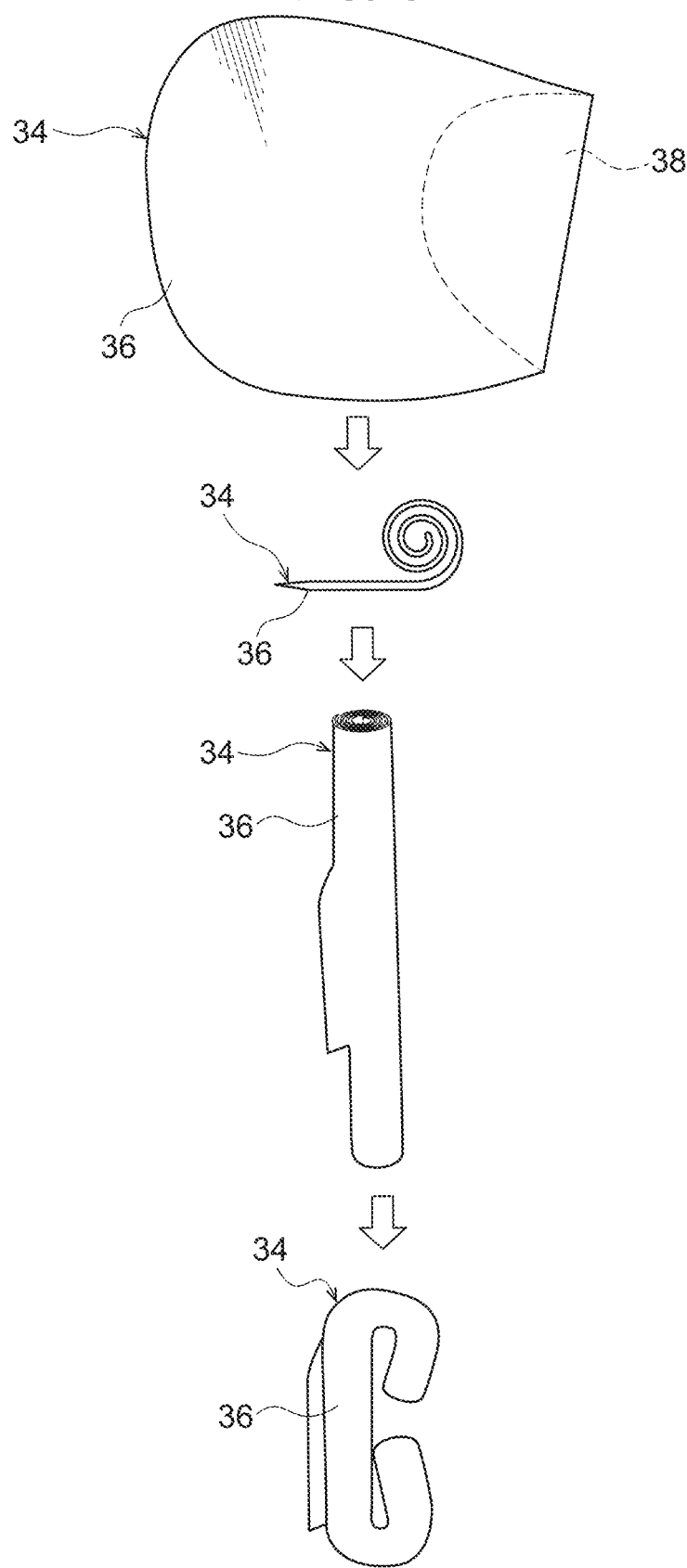
FIG. 16 is an explanatory diagram illustrating a far side airbag folding method according to an exemplary embodiment.

As illustrated in FIG. 16, the far side airbag 34 is folded in the following manner. First the rear deployment section 38 is inward folded (cactus folded) so as to be indented toward the inside of the main chamber 36 (inward folding process). Then the main chamber 36 is rolled up from the outside with an axial direction along the height direction (rolling-from-the-outside process). Note that "rolling-from-the-outside" is a rolling method to form a roll shaped rolled-up location on the opposite side to the passenger P side. Folding is then performed so as to bring an upper end portion and a lower end portion of the main chamber 36 closer to each other (folding process).

In this manner, the main chamber 36 is able to be folded in a compact manner even though the rear deployment section 38 is provided integrally to the rear portion of the main chamber 36. The rear deployment section 38 is folded inwards (cactus folded) and so is easily opened toward the rear side at an early stage during inflation and deployment. Moreover, the main chamber 36 is rolled up from the outside, and so occurrence of a malfunction, such as the main chamber 36 hitting the face of the passenger P seated in the right seat 12R, can be either suppressed of prevented during inflation and deployment of the main chamber 36.

The vehicle passenger restraint device 10 and the far side airbag folding method according to the present exemplary embodiments have described with reference to the drawings, however the vehicle passenger restraint device 10 and the far side airbag folding method according to the present exemplary embodiments are not limited by what is depicted in the drawings, and appropriate design changes may be implemented within a range not departing from the spirit of the present disclosure.

For example, the vehicle applied with the present exemplary embodiments may be a left hand drive vehicle, with the far side airbag device 30 provided to a right side portion of the seatback 16L of the left seat 12L so as to be inflated and deployed in the cases of an impact to the right side face of the vehicle. Moreover, the vehicle applied with the present exemplary embodiments may be a vehicle not provided with a console box 20 in a vehicle cabin. Moreover, the rear deployment section 38 is not limited to being folded inwards a single time as illustrated in FIG. 16, and, although not illustrated in the drawings, may be folded inwards over plural times.

What is claimed is:

1. A vehicle passenger restraint device, comprising:
    a left seat and a right seat provided in a vehicle cabin so as to each be movable in a vehicle front-rear direction;
    an inflator that is provided at a vehicle width direction inner side portion of a seatback of one seat of the left seat or the right seat and that is configured to eject gas on actuation; and
    a far side airbag that is provided at the vehicle width direction inner side portion of the seatback of the one seat, and that is configured so as to be inflated and deployed to a vehicle width direction inner side of a passenger seated in the one seat by being supplied with the gas,
    wherein the far side airbag includes:
        a main chamber; and
        a rear deployment section that is integrally provided at the main chamber, and that is configured so as to be deployed toward a vehicle rear side past a rear face of the seatback of the one seat,
    wherein the far side airbag is configured so as to overlap with a seatback of another seat of the left seat or the right seat in side view even when the other seat is disposed displaced in the vehicle front-rear direction with respect to the one seat, and
    wherein the far side airbag includes a step portion in a vicinity of a contact point where contact is made with a front end of a side portion of the seatback of the other seat in plan view when the one seat is disposed at a furthest forward position and the other seat is disposed at a furthest rearward position.

2. The vehicle passenger restraint device of claim 1, further comprising a console box provided in the vehicle cabin between the left seat and the right seat,
    wherein the far side airbag is configured so as to be inflated and deployed further to a vehicle upper side than an upper face of the console box and so as to cover at least from a waist to a head of the passenger in side view.

3. The vehicle passenger restraint device of claim 2, wherein
    the furthest forward position is a state in which, in side view, a front end face at a lower side of a side portion of the seatback of the one seat is positioned further to a front side of the vehicle cabin than a front face of a front wall of the console box, and
    the furthest rearward position is a state in which, in side view, a front end face at a lower side of the side portion of the seatback of the other seat is positioned further to a rear side of the vehicle cabin than the front face of the front wall of the console box.

4. The vehicle passenger restraint device of claim 1, wherein the step portion is formed by a plurality of straps provided inside the far side airbag.

5. The vehicle passenger restraint device of claim 4, wherein:
    the plurality of straps is disposed so as to connect a proximity point of the inflator on the seatback of the one seat to the front end of the side portion of the seatback of the other seat in plan view; and
    a length of the plurality of straps when in a state in which tension is acting from full inflation and deployment of the far side airbag is set so as to be a minimum distance between a side portion of the seatback of the one seat disposed in the furthest forward position and the side portion of the seatback of the other seat disposed in the furthest rearward position.

6. The vehicle passenger restraint device of claim 1, wherein the step portion is formed by a sub chamber provided at a vehicle width direction inner side of the main chamber and in communication with the main chamber.

7. The vehicle passenger restraint device of claim 6, wherein a boundary portion between a vehicle rear side portion of the sub chamber and a vehicle width direction inner side portion of the main chamber is disposed in plan view at the front end of the side portion of the seatback of the other seat when the one seat is disposed at the furthest forward position and the other seat is disposed at the furthest rearward position.

8. The vehicle passenger restraint device of claim 1, wherein:
    the far side airbag includes a front chamber and a rear chamber partitioned front-and-rear by a partitioning cloth;
    the front chamber configures the main chamber, and the rear chamber configures the rear deployment section; and
    the gas ejected from the inflator is configured so as to be supplied from one of the front chamber or the rear chamber, through a communication hole formed in the partitioning cloth, and into another of the front chamber or the rear chamber.

9. The vehicle passenger restraint device of claim 8, wherein:
    the far side airbag includes a sub chamber provided at a vehicle width direction inner side of the main chamber so as to be in communication with the main chamber; and
    gas ejected from the inflator is configured so as to be supplied to the sub chamber, and also a boundary portion between a vehicle rear side portion of the sub chamber and a vehicle width direction inner side portion of the main chamber is disposed in plan view at a front end of a side portion of the seatback of the other seat when the one seat is disposed at a furthest forward position and the other seat is disposed at a furthest rearward position.

10. The vehicle passenger restraint device of claim 1, wherein the step portion is formed by a single tether provided inside the far side airbag.

11. The vehicle passenger restraint device of claim 10, wherein:
    the single tether is disposed so as to connect a proximity point of the inflator on the seatback of the one seat to the front end of the side portion of the seatback of the other seat in plan view; and
    a length of the single tether when in a state in which tension is acting from full inflation and deployment of the far side airbag is set so as to be a minimum distance between a side portion of the seatback of the one seat disposed in the furthest forward position and the side portion of the seatback of the other seat disposed in the furthest rearward position.

12. The vehicle passenger restraint device of claim 1, wherein the one seat is a driver's seat.

13. The vehicle passenger restraint device of claim 1, wherein inflation and deployment of the rear deployment section are configured to be delayed from inflation and deployment of the main chamber.

14. The vehicle passenger restraint device of claim 1, wherein
the front end of the side portion of the seatback of the other seat, which is in contact with the step portion, is at an upper side of the side portion at a vehicle width direction inner side of the seatback of the other seat.

15. A folding method for a far side airbag of a vehicle passenger restraint device, wherein the vehicle passenger restraint device includes:
a left seat and a right seat provided in a vehicle cabin so as to each be movable in a vehicle front-rear direction;
an inflator that is provided at a vehicle width direction inner side portion of a seatback of one seat of the left seat or the right seat and that is configured to eject gas on actuation; and
the far side airbag that is provided at the vehicle width direction inner side portion of the seatback of the one seat, and that is configured so as to be inflated and deployed to a vehicle width direction inner side of a passenger seated in the one seat by being supplied with the gas,
wherein the far side airbag includes:
a main chamber; and
a rear deployment section that is integrally provided at the main chamber, and that is configured so as to be deployed toward a vehicle rear side past a rear face of the seatback of the one seat,
wherein the far side airbag is configured so as to overlap with a seatback of another seat of the left seat or the right seat in side view even when the other seat is disposed displaced in the vehicle front-rear direction with respect to the one seat, and
wherein the far side airbag includes a step portion in a vicinity of a contact point where contact is made with a front end of a side portion of the seatback of the other seat in plan view when the one seat is disposed at a furthest forward position and the other seat is disposed at a furthest rearward position,
the folding method comprising:
an inward folding process of folding the rear deployment section inward so as to be indented toward an inside of the far side airbag;
a rolling-from-outside process of rolling up the far side airbag resulting from the inward folding process from outside with an axial direction being a vehicle height direction; and
a folding process of folding the far side airbag resulting from the rolling-from-outside process such that an upper end portion and a lower end portion of the far side airbag approach each other.

* * * * *